(12) United States Patent
Oka

(10) Patent No.: US 7,612,784 B2
(45) Date of Patent: Nov. 3, 2009

(54) IMAGE PROCESSOR AND METHOD, COMPUTER PROGRAM, AND RECORDING MEDIUM

(75) Inventor: Masaaki Oka, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 52 days.

(21) Appl. No.: 10/575,529

(22) PCT Filed: Oct. 14, 2004

(86) PCT No.: PCT/JP2004/015570

§ 371 (c)(1),
(2), (4) Date: Jan. 8, 2007

(87) PCT Pub. No.: WO2005/036468

PCT Pub. Date: Apr. 21, 2005

(65) Prior Publication Data

US 2007/0206025 A1   Sep. 6, 2007

(30) Foreign Application Priority Data

Oct. 15, 2003   (JP)   ............................ 2003-354897

(51) Int. Cl.
  G09G 5/00   (2006.01)
  G06K 9/40   (2006.01)
(52) U.S. Cl. ...................................... 345/615; 382/269
(58) Field of Classification Search ................ 345/136, 345/269, 616, 611
  See application file for complete search history.

(56) References Cited

U.S. PATENT DOCUMENTS 5,050,227 A * 9/1991 Furusawa et al. ........... 382/269
5,748,178 A * 5/1998 Drewry ....................... 345/643
5,870,504 A * 2/1999 Nemoto et al. .............. 382/266
6,009,447 A 12/1999 Kubota et al. ............... 708/313

(Continued)

FOREIGN PATENT DOCUMENTS

EP   0 686 941 A2   12/1995

(Continued)

OTHER PUBLICATIONS

Naiman A C: Jagged Edges: when is filtering needed? AMC Transactions on Graphics ACM USA, vol. 17, No. 4, Oct. 1998, pp. 238-258, XP002311600 ISSN: 0730-0301, pp. 238-241 and pp. 249-253.

(Continued)

*Primary Examiner*—Aaron M Richer
(74) *Attorney, Agent, or Firm*—Paul, Hastings, Janofsky & Walker LLP

(57) ABSTRACT

A plurality of relative orientation detection filters having orientation coefficients that represent a relative orientation of a connected sequence of pixel drawing regions with their pixel values distributed in a predetermined pattern in a buffer memory having the same structure as an image memory, and a plurality of smoothing filters having smoothing coefficients for corresponding relative orientations, are prepared. A rendering unit draws an image to the buffer memory. A relative orientation of an edge in this image is detected by means of selecting out one relative orientation detection filter that is most suitable for the relative orientation in question. Pixel values for the edge are smoothed by using the smoothing filter according to the detected relative orientation. Then, drawing data including the smoothed pixel values are written into the image memory.

12 Claims, 14 Drawing Sheets

U.S. PATENT DOCUMENTS

| | | | | |
|---|---|---|---|---|
| 6,097,400 | A | 8/2000 | Dilliplane et al. | 345/443 |
| 6,798,422 | B2* | 9/2004 | Wang | 345/611 |
| 6,873,741 | B2* | 3/2005 | Li | 382/266 |
| 7,027,065 | B2* | 4/2006 | Shin et al. | 345/582 |
| 7,161,602 | B2* | 1/2007 | Shan | 345/606 |
| 7,167,595 | B2* | 1/2007 | Hiroshige et al. | 382/266 |
| 2003/0198399 | A1 | 10/2003 | Atkins | 382/261 |

OTHER PUBLICATIONS

Gonzalez R C et al: "Digital Image Processing, Passage" Digital Image Processing, Upper Saddle River, NJ: Prentice Hall, US, 2002, pp. 577-585, XP002291912 ISBN: 0-201-18075-8 (the whole document).

International Search Report.

* cited by examiner (a)

| 0 | 1 | 0 | 0 | 0 |
| 0 | 1 | 1 | 0 | 0 |
| 0 | 0 | 1 | 0 | 0 |
| 0 | 0 | 1 | 1 | 0 |
| 0 | 0 | 0 | 1 | 0 |

⎰51

50

(b)

| 0 | 1/3.2 | 0 | 0 | 0 |
| 0 | 1/2.4 | 1/2 | 0 | 0 |
| 0 | 0 | 1 | 0 | 0 |
| 0 | 0 | 1/2 | 1/2.4 | 0 |
| 0 | 0 | 0 | 1/3.2 | 0 |

⎰52

(c)

| 0 | 0.09 | 0 | 0 | 0 |
| 0 | 0.12 | 0.14 | 0 | 0 |
| 0 | 0 | 0.29 | 0 | 0 |
| 0 | 0 | 0.14 | 0.12 | 0 |
| 0 | 0 | 0 | 0.09 | 0 |

| 0 × 0 | 0 × 0.1 | 1 × 0 | 1 × 0 | 1 × 0 |
| --- | --- | --- | --- | --- |
| 0 × 0 | 0 × 0.15 | 1 × 0.15 | 1 × 0 | 1 × 0 |
| 0 × 0 | 0 × 0 | 1 × 0.2 | 1 × 0 | 1 × 0 |
| 0 × 0 | 0 × 0 | 0 × 0.15 | 1 × 0.15 | 1 × 0 |
| 0 × 0 | 0 × 0 | 0 × 0 | 1 × 0.1 | 1 × 0 |

1 × 0.15 + 1 × 0.2 + 1 × 0.15 + 1 × 0.1 = 0.6

IMAGE PROCESSOR AND METHOD, COMPUTER PROGRAM, AND RECORDING MEDIUM

TECHNICAL FIELD

The present invention relates to an image processing technique with which operation such as anti-aliasing can be performed using less resources without producing unintended colors.

BACKGROUND ART

Significant breakthroughs have been made in integration of hardware components including processors and memories with faster processing clocks for systems such as game console devices that perform real-time image processing. This enables real-time production of wide variety of realistic images reproduced in every detail, which had been impossible through conventional techniques.

This rapid advancement of the image processing techniques causes typical two-dimensional screens such as television monitors to lag far behind the recent improvements in image quality. For example, standard National Television System Committee (NTSC) television monitors can only display images at low resolutions of around 640 by 448 dots per frame (two fields).

When an image with diagonal edges is displayed especially on a low-resolution two-dimensional screen, these edges extending in a slanting direction appear jagged. Jagged edges are caused because every diagonal edge is built up by square pixels that are stepped on top of one another. These "steps" are called jaggies. Horizontal or vertical edges have no jaggies. Diagonal edges at 45 degrees with respect to the horizontal or vertical axis have the largest number of jaggies when compared among line segments of the same length. More jaggies are visible as the diagonal edge gets closer to 45 degrees. On the other hand, more aliases are visible on diagonal edges closer to the horizontal or vertical. It should be noted that diagonal edges at slight angles against the horizontal or vertical axis have not much jaggies but have a series of step-like patterns, called "aliasing", which appear more noticeable than on the diagonal edges at 45 degrees.

Taking the above into consideration, systems that process images to be displayed on a two-dimensional screen of a relatively low resolution typically has a function of performing anti-aliasing operation to draw a smooth image without jaggies to an image memory. Anti-aliasing is a technique of making edges in an image appear much smoother or blurring edges to remove aliases on the line.

There are various anti-aliasing techniques, some of which are given below.

(1) First Technique

The percentage of coverage is computed for each pixel on the edge. This percentage of coverage is used as the $\alpha$ value for the blending of the edge with the background. For example, a foreground color pixel Cs is blended with a background color pixel Cd, thereby producing a blended color value C. This is represented by the following equation:

$C=\alpha*Cs+(1-\alpha)*Cd.$

As apparent from the above, the color value C of the pixels for the edge can be given by adding the product of $\alpha$ and Cs (the color value of the pixel in the foreground) to the result of 1 minus $\alpha$, all multiplied by Cd (the color value of the pixel in the background). This blending provides gradation (multi-scale pixels) on the edge, so that possible aliasing on the edges can be reduced.

(2) Second Technique

The image is rendered at high resolution and then filtered to eventually reduce the number of pixels in the image. For example, the image is rendered at a higher resolution than the display screen. The pixels in the image are then averaged to the final resolution before being copied to the display. This expects to produce effects similar to those obtained by gradation.

DISCLOSURE OF INVENTION

With the above-mentioned first technique, certain pixels such as background pixels should be drawn to the image memory before drawing of edges in order to make it possible to predictively determine which color value will be adjacent to the edge on the screen. This technique requires a back-to-front sort of all the image components (polygons) in a scene, including the background and the image to be rendered thereon, so that they are ordered from front to back.

The second technique involves image rendering at a higher resolution than the display screen. This takes more time to draw images with a larger capacity of image memory.

The major object of the present invention is to provide an image processing technique with which anti-aliasing can be performed using less resources without producing unintended colors and without any problems such as the above.

The present invention provides an image processor, a method, a computer program, and a recording medium for use in implementing a characteristic anti-aliasing operation.

An image processor having a first configuration provided by the present invention is the one for use in drawing an image to a memory having a two-dimensional matrix of pixel drawing regions, each of the pixel drawing regions representing a single pixel in the image, an edge of the image, if any, being jagged when it extends in a slanting direction with respect to the vertical or horizontal axis of the matrix, the image processor comprising: a plurality of relative orientation detection filters each representing a distinguishing feature of a relative orientation of an edge segment to be drawn to the memory; drawing means for drawing the image to the memory or a buffer having the same structure as the memory; detection means for detecting a connected sequence of pixel drawing regions making up an edge in the image drawn by the drawing means, and detecting the relative orientation of the connected sequence of pixel drawing regions by means of selecting out one relative orientation detection filter representing the distinguishing feature that is closest to the distinguishing feature of the connected sequence of pixel drawing regions in question; and smoothing means for smoothing a pixel value of each pixel in the connected sequence of pixel drawing regions on the edge using smoothing coefficients, the smoothing coefficients being either computed depending on the relative orientation detected by the detection means or obtained from outside.

In the image processor having the above-mentioned structure, the drawing means draws an image to a memory or a buffer before the detection means detects a connected sequence of pixel drawing regions making up the edge in the drawn image. The detection means also detects the relative orientation of the connected sequence of pixel drawing regions using a plurality of relative orientation detection filters. Subsequently, the smoothing means smoothes the pixel values of the pixel drawing regions making up the edge by using smoothing coefficients computed according to the detected relative orientation or obtained from outside. Therefore, complicated operations for anti-aliasing can be eliminated which otherwise have been required in drawing images to a memory, allowing image processing using less resources without producing unintended colors.

The term "connected sequence" when used in reference to the pixel drawing regions, means that the pixel drawing regions are relatively aligned with each other in one of eight compass directions.

Each of the plurality of relative orientation detection filters can be achieved as a two-dimensional matrix of predetermined orientation coefficients, the orientation coefficients including zero orientation coefficients each having a value of zero and non-zero orientation coefficients each having a value other than zero, the non-zero orientation coefficients being aligned relative to each other in a predetermined direction. In such a case, the detection means performing convolution of all orientation coefficients contained in the relative orientation detection filters, with each pixel value of the connected sequence of pixel drawing regions making up the edge, the detection means then selecting out one relative orientation detection filter for which the convolution result in a single direction exceeds a predetermined threshold value and yields the largest result, as the relative orientation filter having the distinguishing feature that is closest to the distinguishing feature in the subject direction.

The smoothing means may be configured to have a plurality of smoothing filters each containing predetermined smoothing coefficients, the smoothing coefficients including zero smoothing coefficients each having a value of zero and non-zero smoothing coefficients each having a value other than zero, the smoothing filter being linked to one of the relative orientation detection filters in such a manner that the non-zero smoothing coefficients being arranged in the same pattern as the non-zero orientation coefficients in the relative orientation detection filters, the smoothing means identifying, in response to the selection of the relative orientation detection filter by the detection means, the smoothing filter that is linked to the selected relative orientation detection filter, performing convolution of the smoothing coefficients of the identified smoothing filter individually with each pixel value of the connected sequence of pixel drawing regions making up the edge, and replacing a target pixel value in the connected sequence of pixel drawing regions with the convolution result, thereby smoothing the focused pixel value. According to this configuration, detection of the relative orientation automatically identifies the smoothing filter associated therewith and each target pixel value in the connected sequence of pixel drawing regions is smoothed by using the smoothing coefficients in this smoothing filter. This reduces the entire load for drawing operations.

The term "target pixel value" as used herein means a single pixel value to be smoothed, located at the center of the filter. It should be noted that the target pixel value or merely the target pixel is a relative designation relative to the surrounding pixel values or pixels on which the filter is overlaid.

Each of the relative orientation detection filters may be a two-dimensional matrix of predetermined orientation coefficients, the orientation coefficients including zero orientation coefficients each having a value of zero and non-zero orientation coefficients each having a value other than zero, the non-zero orientation coefficients being aligned relative to each other in a predetermined direction. In such a case, the detection means performs convolution of all orientation coefficients contained in the relative orientation detection filters, with each pixel value of the connected sequence of pixel drawing regions in the buffer memory. The detection means then selects out one relative orientation detection filter for which the convolution result in a single direction exceeds a predetermined threshold value and yields the largest result, as the relative orientation filter that is most suitable for the relative orientation in question.

An image processor having a second configuration provided by the present invention is the one for use in drawing an image to a memory having a two-dimensional matrix of pixel drawing regions, each of the pixel drawing regions representing a single pixel in the image, an edge of the image, if any, being jagged when it extends in a slanting direction with respect to the vertical or horizontal axis of the matrix, the image processor comprising: a plurality of relative orientation detection filters each representing a distinguishing feature of a relative orientation of an edge segment to be drawn to the memory; drawing means for drawing the image to the memory or a buffer having the same structure as the memory; detection means for detecting a connected sequence of pixel drawing regions making up an edge in the image drawn by the drawing means, and detecting the relative orientation of the connected sequence of pixel drawing regions by means of selecting out a predetermined number of relative orientation detection filters each representing a distinguishing feature that is closer to the distinguishing feature of the connected sequence of pixel drawing regions, and performing interpolation with the relative orientations specified by the selected relative orientation detection filters; and smoothing means for smoothing a pixel value of each pixel in the connected sequence of pixel drawing regions on the edge using smoothing coefficients, the smoothing coefficients being either computed depending on the relative orientation detected by the detection means or obtained from outside.

In the image processor having the above-mentioned configuration, unlike the first image processor, the detection means selects out a predetermined number of relative orientation detection filters each representing a distinguishing feature that is closer to the distinguishing feature of the connected sequence of pixel drawing regions on the edge in the drawn image, and performs interpolation with the relative orientations specified by the relative orientation detection filters to detect the relative orientation of the connected sequence of pixel drawing regions. Consequently, orientation detection can be made with high accuracy even with a less number of relative orientation detection filters as compared with the first image processor.

More specifically, the detection means performs convolution of all orientation coefficients contained in the relative orientation detection filters, with each pixel value of the connected sequence of pixel drawing regions making up the edge, selects out a predetermined number of relative orientation detection filters for which their respective convolution results in a single direction exceed a predetermined threshold value and yield the largest result, the second largest result, and the third largest result, respectively, as the relative orientation filters having their respective distinguishing features that are closer to the distinguishing feature in the subject direction, and distributes, using interpolation, the relative orientations specified by the selected relative orientation detection filters, thereby determining one relative orientation.

In the first and second image processors, the smoothing means may be configured to generate a smoothing filter which is a matrix of predetermined smoothing coefficients, the smoothing coefficients including zero smoothing coefficients each having a value of zero and non-zero smoothing coefficients each having a value other than zero, the non-zero smoothing coefficients in the generated smoothing filter being arranged in the direction of the relative orientation detected by the detection means, perform convolution of the smoothing coefficients of that smoothing filter individually with each pixel value of the connected sequence of pixel drawing regions making up the edge, and replace a target pixel value in the connected sequence of pixel drawing regions with the convolution result, thereby smoothing the focused pixel value.

Regardless of whether the smoothing filters are previously prepared or generated every time when it becomes necessary, each smoothing filter may have a two-dimensional matrix of smoothing coefficients, the smoothing coefficients including zero smoothing coefficients each having a value of zero and non-zero smoothing coefficients each having a value other than zero, the non-zero smoothing coefficients more distant from the center of the filter having smaller non-zero values, the non-zero smoothing coefficients being arranged in the direction of the detected relative orientation. In such a case, the smoothing means is configured to perform convolution of all smoothing coefficients contained in the smoothing filter in question, with a target pixel in the connected sequence of pixel drawing regions making up the edge in such a manner that the center of the smoothing filter is matched with the target pixel.

In a preferred aspect of the present invention, the smoothing coefficients in each smoothing filter are normalized so that the smoothing filters with different patterns of arrangement of the smoothing coefficients are on the same scale. The smoothing filters having this configuration allow convolution with pixel values of a relative magnitude. The amount of operations can be reduced and thus the smoothing can be performed more effectively as compared with the case where no normalization is performed.

Not all the pixels in the connected sequence of pixel drawing regions are required to be smoothed. Instead, smoothing may be performed when necessary. In such a case, the smoothing means may be configured to perform smoothing only when the relative orientation detected by the detection means forms a predetermined angle with respect to the horizontal or vertical axis of the matrix and when at least a predetermined number of pixel drawing regions having the same relative orientation are arranged in sequence.

A first image processing method according to the present invention is the one performed by a processor having access to a memory to which an image is drawn and a plurality of relative orientation detection filters, the memory having a two-dimensional matrix of pixel drawing regions, each of the pixel drawing regions representing a single pixel in the image, an edge of the image, if any, being jagged when it extends in a slanting direction with respect to the vertical or horizontal axis of the matrix, each of the relative orientation detection filters representing a distinguishing feature of a relative orientation of an edge segment to be drawn to the memory. The method comprises the following steps of:

(1) drawing the image to the memory or a buffer having the same structure as the memory without performing anti-aliasing operation;

(2) detecting a connected sequence of pixel drawing regions making up an edge in the drawn image;

(3) detecting the relative orientation of the connected sequence of pixel drawing regions by means of selecting out one relative orientation detection filter representing the distinguishing feature that is closest to the distinguishing feature of the connected sequence of pixel drawing regions in question; and (4) generating a smoothing filter which is a matrix of smoothing coefficients, the smoothing coefficients including zero smoothing coefficients each having a value of zero and non-zero smoothing coefficients each having a value other than zero, the non-zero smoothing coefficients in the generated smoothing filter being arranged in the direction of the relative orientation, or alternatively, obtaining the smoothing filter that has been prepared previously;

performing convolution of the smoothing coefficients of that smoothing filter individually with each pixel value of the connected sequence of pixel drawing regions; and replacing a target pixel value in the connected sequence of pixel drawing regions with the convolution result, thereby smoothing the focused pixel value, thereby anti-aliasing the image having the edge including the target pixel value.

A second image processing method according to the present invention is the one performed by a processor having access to a memory to which an image is drawn and a plurality of relative orientation detection filters, the memory having a two-dimensional matrix of pixel drawing regions, each of the pixel drawing regions representing a single pixel in the image, an edge of the image, if any, being jagged when it extends in a slanting direction with respect to the vertical or horizontal axis of the matrix, each of the relative orientation detection filters representing a distinguishing feature of a relative orientation of an edge segment to be drawn to the memory. The method comprises the following steps of:

(1) drawing the image to the memory or a buffer having the same structure as the memory without performing anti-aliasing operation;

(2) detecting a connected sequence of pixel drawing regions making up an edge in the drawn image;

(3) detecting the relative orientation of the connected sequence of pixel drawing regions by means of selecting out a plurality of relative orientation detection filters each representing a distinguishing feature that is close to the distinguishing feature of the connected sequence of pixel drawing regions, and performing interpolation with the relative orientations specified by the selected relative orientation detection filters; and (4) generating a smoothing filter which is a matrix of smoothing coefficients, the smoothing coefficients including zero smoothing coefficients each having a value of zero and non-zero smoothing coefficients each having a value other than zero, the non-zero smoothing coefficients in the generated smoothing filter being arranged in the direction of the relative orientation, or alternatively, obtaining the smoothing filter that has been prepared previously;

performing convolution of the smoothing coefficients of that smoothing filter individually with each pixel value of the connected sequence of pixel drawing regions; and replacing a target pixel value in the connected sequence of pixel drawing regions with the convolution result, thereby smoothing the focused pixel value, thereby anti-aliasing the image having the edge including the target pixel value.

A first computer program according to the present invention is the one executed by a processor having access to a memory to which an image is drawn and a plurality of relative orientation detection filters, the memory having a two-dimensional matrix of pixel drawing regions, each of the pixel drawing regions representing a single pixel in the image, an edge of the image, if any, being jagged when it extends in a slanting direction with respect to the vertical or horizontal axis of the matrix, each of the relative orientation detection filters representing a distinguishing feature of a relative orientation of an edge segment to be drawn to the memory. This computer program is for the processor to perform the operations of:

(1) drawing the image to the memory or a buffer having the same structure as the memory without performing anti-aliasing operation;

(2) detecting a connected sequence of pixel drawing regions making up an edge in the drawn image;

(3) detecting the relative orientation of the connected sequence of pixel drawing regions by means of selecting out one relative orientation detection filter representing the distinguishing feature that is closest to the distinguishing feature of the connected sequence of pixel drawing regions in question; and (4) generating a smoothing filter which is a matrix of smoothing coefficients, the smoothing coefficients including zero smoothing coefficients each having a value of zero and non-zero smoothing coefficients each having a value other than zero, the non-zero smoothing coefficients in the generated smoothing filter being arranged in the direction of the relative orientation, or alternatively, obtaining the smoothing filter that has been prepared previously;

performing convolution of the smoothing coefficients of that smoothing filter individually with each pixel value of the connected sequence of pixel drawing regions; and replacing a target pixel value in the connected sequence of pixel drawing regions with the convolution result, thereby smoothing the focused pixel value, thereby anti-aliasing the image having the edge including the target pixel value.

A second computer program according to the present invention is the one executed by a processor having access to a memory to which an image is drawn and a plurality of relative orientation detection filters, the memory having a two-dimensional matrix of pixel drawing regions, each of the pixel drawing regions representing a single pixel in the image, an edge of the image, if any, being jagged when it extends in a slanting direction with respect to the vertical or horizontal axis of the matrix, each of the relative orientation detection filters representing a distinguishing feature of a relative orientation of an edge segment to be drawn to the memory. This computer program is for the processor to perform the operations of:

(1) drawing the image to the memory or a buffer having the same structure as the memory without performing anti-aliasing operation;

(2) detecting a connected sequence of pixel drawing regions making up an edge in the drawn image;

(3) detecting the relative orientation of the connected sequence of pixel drawing regions by means of selecting out a plurality of relative orientation detection filters each representing a distinguishing feature that is close to the distinguishing feature of the connected sequence of pixel drawing regions, and performing interpolation with the relative orientations specified by the selected relative orientation detection filters; and (4) generating a smoothing filter which is a matrix of smoothing coefficients, the smoothing coefficients including zero smoothing coefficients each having a value of zero and non-zero smoothing coefficients each having a value other than zero, the non-zero smoothing coefficients in the generated smoothing filter being arranged in the direction of the relative orientation, or alternatively, obtaining the smoothing filter that has been prepared previously;

performing convolution of the smoothing coefficients of that smoothing filter individually with each pixel value of the connected sequence of pixel drawing regions; and replacing a target pixel value in the connected sequence of pixel drawing regions with the convolution result, thereby smoothing the focused pixel value, thereby anti-aliasing the image having the edge including the target pixel value.

These computer programs may be distributed over a communication network. Alternatively, they may be recorded on a computer-readable recording media, such as RAMs, DVD-ROMs, semiconductor memories, and other similar recording media, for public distribution.

The present invention detects a relative orientation of a connected sequence of pixel drawing regions making up an edge in an image to be drawn, smoothes the pixel values of the pixel drawing regions on the edge by using smoothing coefficients computed according to the detected relative orientation, and writes drawing data including the smoothed pixel values into an image memory. This provides a mechanism to implement high quality image processing at lower costs.

BRIEF DESCRIPTION OF DRAWINGS

FIG. 1 is a configuration diagram of an image processor which the present invention is applied to;

FIG. 3 is a representation for illustrating how a smoothing filter is generated;

FIG. 5 is a representation for illustrating what the anti-aliasing is like;

FIG. 14 is another configuration diagram of an image processor which the present invention is applied to;

FIG. 17($b$) is a representation of edge region data; and

FIG. 17($c$) is a representation of edge direction data.

BEST MODE FOR CARRYING OUT THE INVENTION

Figure 1:
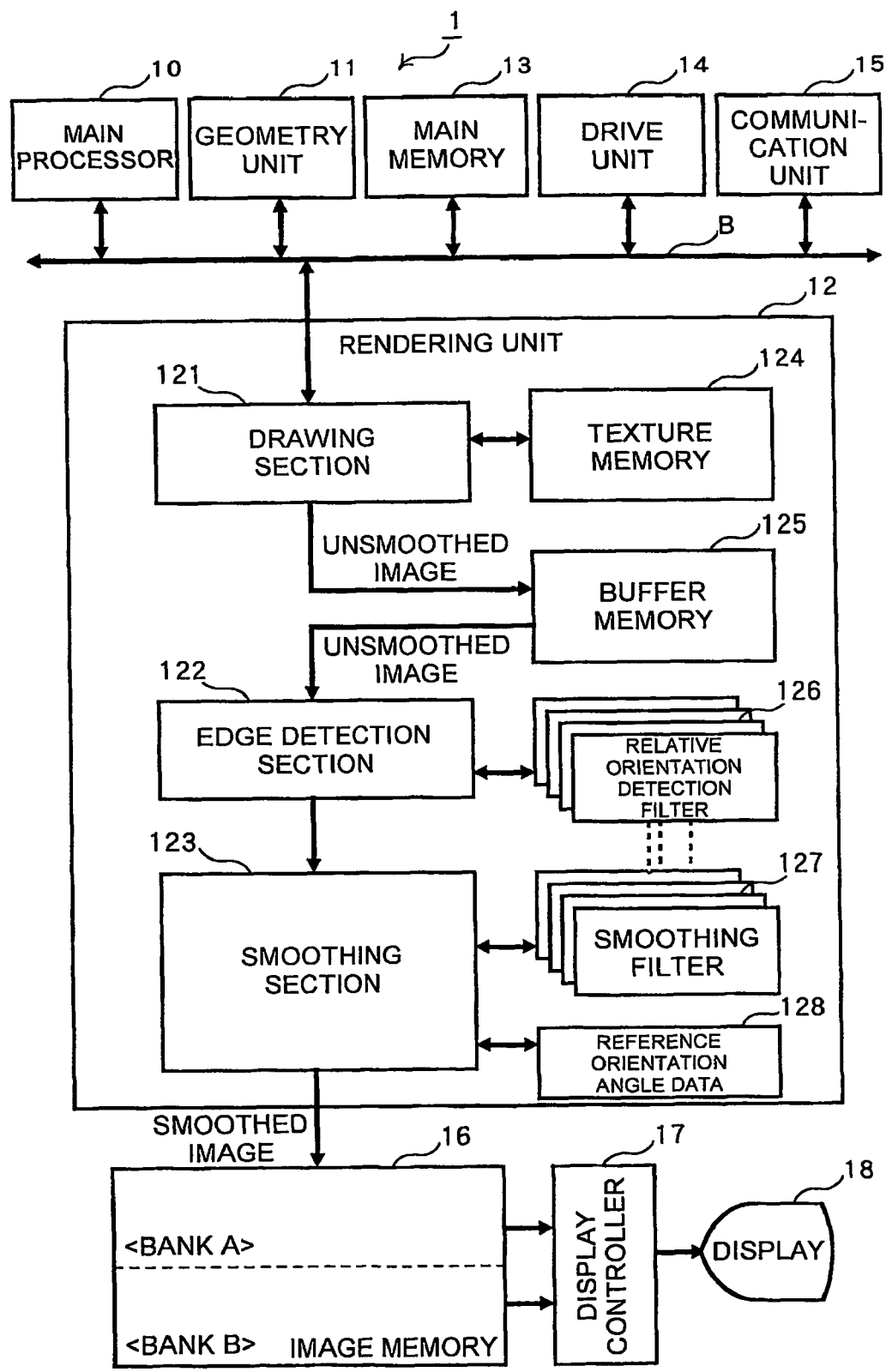

FIG. 1 shows a configuration of an image processor which the present invention is applied to.

The image processor 1 comprises a main processor 10, a geometry unit 11, a rendering unit 12, a main memory 13, a drive unit 14 and a communication unit 15, all of which are connected to each other through a bus B. The rendering unit 12 is connected to an image memory 16 having pixel drawing regions that are arranged in the form of a two-dimensional matrix. Each pixel drawing region in the matrix represents a single pixel in the final image.

As will be described later, images after smoothing are first drawn to the image memory 16 and then copied to the display screen 18. The image processor 1 also comprises a display controller 17 which is used for copying the image memory 16 to the display screen 18.

The main memory 13 contains graphics information for polygons to be drawn (displayed), such as coordinates of vertices, R (red), G (green), and B (blue) color values for each vertex and mapping coordinates values, vertex information such as vector values, and vertices-connecting information. The graphics information may be, for example, information read by the drive unit 14 under the control of the main processor 10 from various recording media such as CD-ROMs, DVD-ROMs, and semiconductor memories loaded into it. Alternatively, the graphics information may be information obtained by the communication unit 15 through a wireless or fixed-line communication medium or transmission medium.

The geometry unit 11 reads the above-mentioned graphics information from the main memory 13 under the control of the main processor 10. The geometry unit 11 then performs geometry processing, e.g., affine transformation, projection transformation to screen coordinates, and vertex processing associated with a light source, to the graphics information. Results of the geometry processing are supplied to the rendering unit 12.

The rendering unit 12 performs drawing operations (rendering) including anti-aliasing according to the results of the geometry processing supplied from the geometry unit 11 and generates drawing data that are going to be written into the image memory 16.

In order to achieve characteristic drawing operations of the present invention, certain functional components are provided in the rendering unit 12 typically through a rendering processor (not shown) in cooperation with a computer program for drawing that is stored in an internal memory. The functional components include drawing section 121, an edge detection section 122, and a smoothing section 123. The rendering unit 12 includes a texture memory 124, a buffer memory 125, a plurality of relative orientation detection filters 126, a plurality of smoothing filters 127, and reference orientation angle data 128, all of which are recorded on the recording device accessible by the rendering processor. The texture memory 124 contains texture attributes of images. The reference orientation angle data 128 are used for determining an angle condition relating to whether below-described smoothing processing should be made.

The texture attributes recorded on the texture memory 124 may be, for example, those obtained from various recording media such as CD-ROMs, DVD-ROMs, and semiconductor memories or obtained through a wireless or fixed-line communication medium or transmission medium.

The buffer memory 125 has pixel drawing regions arranged in the same manner (i.e., in the form of a two-dimensional matrix) as the pixel drawing regions of the image memory 16. The buffer memory 125 is mainly used as a buffer for edge detection, orientation detection, and smoothing of edges of the objects making up an image.

An edge of an image object is defined as a significant change in the image intensity between adjacent pixels. The relative orientation detection filters 126 are used for identifying the relative orientation (i.e., angle of the slope) of each edge. Each relative orientation detection filter 126 is a matrix of numbers used in image convolution. These numbers are herein referred to as orientation coefficients. Convolution of an image is a process by which each pixel of an image is multiplied by a filter to create a new pixel value. The relative orientation detection filters 126 are identified by the angle as measured relative to the horizontal axis. These relative orientation detection filters 126 contain patterns of orientation coefficients. Some examples of the relative orientation detection filters 126 are shown in FIGS. 2(a) to 2(f) in which a rectangular grid is used for clarity and convenience. The gradients in the horizontal (0 degrees) and vertical (90 degrees) directions can be determined with the relative orientation detection filter 126 shown in FIGS. 2(f) and 2(e), respectively. For the purpose of better understanding of patterns of orientation coefficients, let a straight line be extended in the direction of the relative orientation passing through the center of the matrix. The line passes the midpoint of the sides of the squares. The orientation coefficient "1" is contained in these squares on the line for the 0- and 90-degree directions. Likewise, the gradients in the diagonal directions can be determined with the relative orientation detection filters 126 shown in FIGS. 2(a) and 2(d) for gradients in 45-degree and 135-degree directions, respectively. The straight line extended in the direction of the relative orientation passes the vertices of the squares aligned diagonally in the filter. The orientation coefficient "1" is thus contained in the squares aligned in the diagonal direction. On the other hand, different patterns of orientation coefficients must be used for other angles such as 60 and 120 degrees. Again, let a straight line be extended in the direction of the relative orientation passing through the center of the matrix. The orientation coefficient "0.5" is contained in such a pair of squares that share the side through which the straight line passes. This is shown in FIGS. 2(b) and 2(c). It should be noted that the orientation coefficients are not limited to "1" and "0.5". Other values may be used as long as they allow easier orientation detection.

The smoothing filters 127 are used for smoothing images. Each of the smoothing filters 127 is defined by a two-dimensional array of numbers, i.e., smoothing coefficients, as in the case of the relative orientation detection filters 126. In the smoothing filter 127, smoothing coefficients more distant from the center of the filter array have smaller values. The smoothing filters 127 may be provided previously, or alternatively, they may be generated and stored every time when the smoothing is performed.

Smoothing coefficients are used for changing values of pixels from each pixel drawing region according to the gradient of an edge (i.e., the gradient of a connected sequence of pixel drawing regions for the edge). The smoothing coefficient has a value between the maximum "1" and the minimum "0". The smoothing coefficients in the matrix are usually normalized to 1 so that the smoothing filters 127 with different patterns of arrangement of the smoothing coefficients are on the same scale. This means that the sum of all smoothing coefficients is equal to 1.

Each smoothing filter 127 has an index that is associated with the relative orientation of an edge to be smoothed using the smoothing coefficients. This index serves to distinguish a smoothing filter from other smoothing filters. For example, an index of "30-degree smoothing filter" is applied to a smoothing filter for changing pixel values in an edge forming an angle of 30 degrees with respect to the horizontal. Likewise, an index of "120-degree smoothing filter" is applied to a smoothing filter for changing pixel values in an edge forming an angle of 120 degrees with respect to the horizontal, and so on.

In this embodiment, mainly from the viewpoint of speeding up the drawing operations, each smoothing filter 127 is linked one by one to the relative orientation detection filter 126 associated with the same relative orientation in order to make it possible to immediately read corresponding smoothing filter when any one of relative orientation detection filter 126 is selected.

Figure 2:
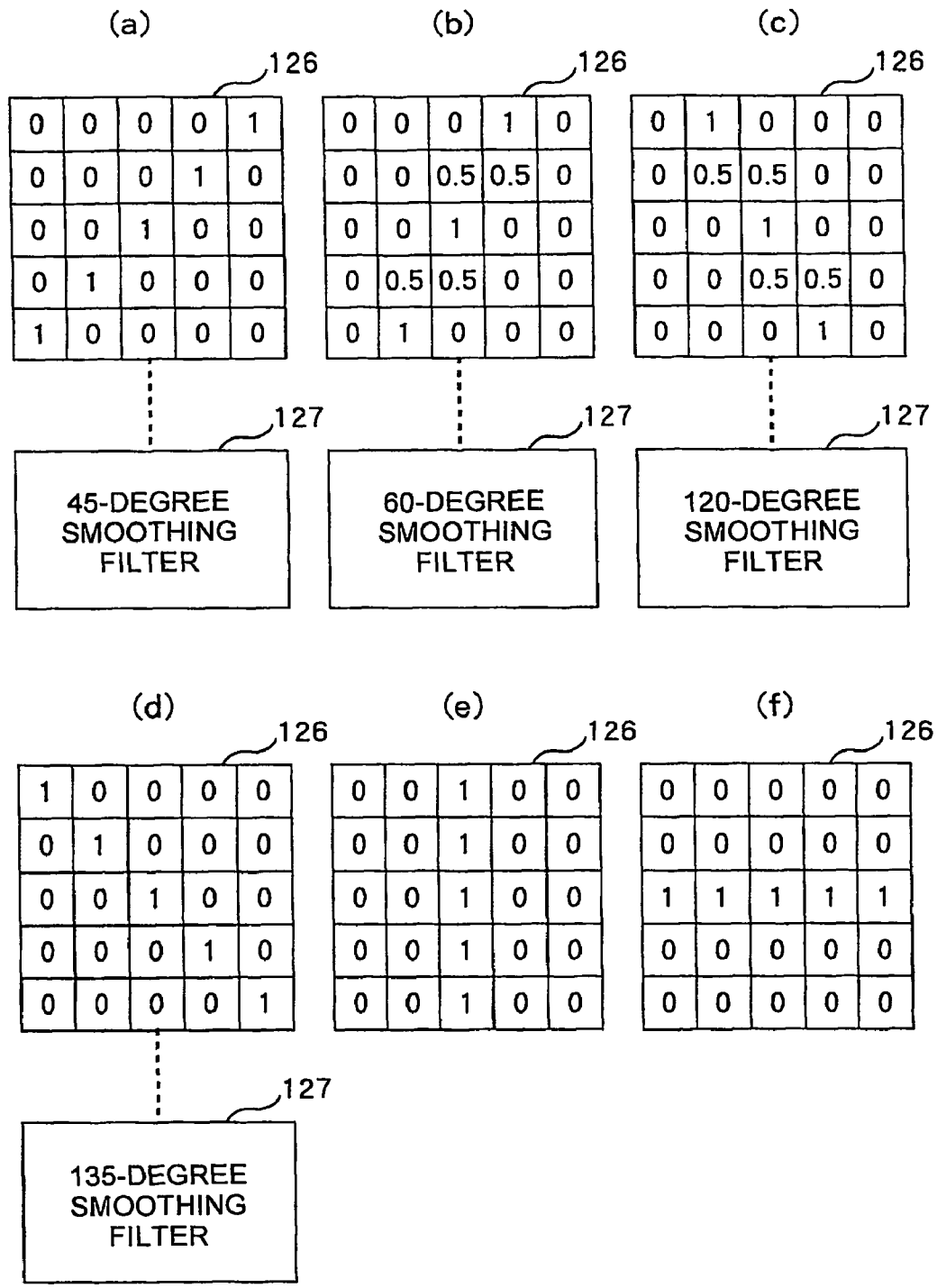
FIG. 2 is a view showing relationships between relative orientation detection filters and smoothing filters.

FIG. 2 shows relationships between the relative orientation detection filters 126 and the smoothing filters 127 in this case. FIG. 2(*a*) shows a combination of a relative orientation detection filter 126 for a gradient of 45 degrees and a 45-degree smoothing filter. FIG. 2(*b*) shows a combination of a relative orientation detection filter 126 for a gradient of 60 degrees and a 60-degree smoothing filter. FIG. 2(*c*) shows a combination of a relative orientation detection filter 126 for a gradient of 120 degrees and a 120-degree smoothing filter. FIG. 2(*d*) shows a combination of a relative orientation detection filter 126 for a gradient of 135 degrees and a 135-degree smoothing filter. FIG. 2(*e*) shows a relative orientation detection filter 126 for the vertical direction (90 degrees). FIG. 2(*f*) shows a relative orientation detection filter 126 for the horizontal direction (0 degrees). It should be noted that no smoothing filter is linked to the relative orientation detection filters for the horizontal and vertical directions in this embodiment because jaggies do not occur in these directions, meaning that smoothing is unnecessary. However, smoothing filters may be linked to the relative orientation detection filters for these directions.

The smoothing operation may optionally be skipped when being unnecessary. Whether the smoothing is necessary or not is determined using the reference orientation angle data 128. Aliasing tends to be more noticeable as the edge approaches the horizontal or vertical axis. Therefore, it is difficult to determine the necessity of smoothing only on the basis of the angle. With the concept of the reference angle that is represented by the reference orientation angle data 128, the above-mentioned optional processing can be achieved easily by means of comparing the gradient angle detected by the edge detection section 122 with the reference angle.

The reference angle may be selected in a simple manner: for example, horizontal, 0 degrees corresponding to the vertical direction, 90 degrees, 180 degrees and 270 degrees. When the gradient angle detected by the edge detection section 122 is substantially equal to one of these angles, the smoothing operation is skipped. Otherwise the smoothing operation is performed. The reference angle may have a certain range. For example, it may be equal to or larger than 30 degrees but not larger than 60 degrees. When the detected gradient angle falls within the range of the reference angle, the smoothing may be skipped. Alternatively, the smoothing may be performed only when the detected gradient angle falls within the range.

The drawing section 121 takes results data of the geometry processing that are supplied from the geometry unit 11 and also takes texture attributes from the texture memory 124. The drawing section 121 computes a pixel value according to these data. In addition, the drawing section 121 writes the computed pixel value into the buffer memory 125 without anti-aliasing. In other words, it performs processing for drawing unsmoothed images to the buffer memory 125. This drawing operation is a processing to obtain pixel values to be written into the pixel drawing regions by means of, for example, transforming strip-like or fan-like polygon mesh structured data into independent polygon data; analyzing, for example, drawing position data, depth data, and color data contained in the result data of the geometry processing to perform area culling and back-face culling (area culling allows setting the size of objects that will not be displayed, i.e., setting the number of pixels below which objects are culled), thereby discarding unnecessary polygon data; combining color data; and reflecting texture attributes to images.

The edge detection section 122 is for automatic identification of edges and their gradients. More specifically, the edge detection section 122 reads the pixel values in the individual pixel drawing regions of the buffer memory 125. It performs processing to identify the location of pixel drawing regions that are presumed to make up an edge by applying an edge extraction filter (not shown) to the image drawn to the buffer memory 125.

The edge extraction filter may be implemented by, for example, one of well-known techniques described below. It may be a level filter that can detect edges using the difference in level obtained by a first derivative of the image; a simple Laplacian filter that can detect edges using second order derivatives; a Laplacian filter that is less susceptible to noise (a Laplacian of Gaussian filter), which performs smoothing the edge over a given range and then takes a second derivative of the smoothed edge; a bridge filter (a filter based on the second directional derivative) that can detect edges by working out the value of the function at the particular discrete elements of a simple Laplacian operator; and a surfboard filter (a version of the Laplacian filter) that can detect edges by subtracting an average of the pixel values in the n by n region (n=3, 5, 7) from each pixel of the original image. Specific and detailed approaches about how to identify connected sequences of pixel drawing regions making up edges can be found in Azriel Rosenfeld, Avinash C. Kak, translated by Makoto Nagao, "Digital Picture Processing", 1978, Kindai Kagakusha, pp. 281-304).

For the identified pixel drawing regions that are expected to make up the edge, the edge detection section 122 selects out a relative orientation detection filter 126 that is most suitable for the possible edge in question. The edge detection section 122 then identifies the relative orientation represented by the selected relative orientation detection filter 126. In this way, it is possible to automatically determine whether the subject pixel drawing regions make up an actual edge. If it is the edge, then the edge detection section 122 determines the direction of gradient. Detailed procedures performed in the edge detection section 122 will be described later.

The smoothing section 123 performs the operation to smooth pixel values of the pixel drawing regions for an edge which requires smoothing with the above-mentioned smoothing coefficient. The smoothing section 123 then writes drawing data including the smoothed pixel values into the image memory 16. The smoothing section 123 also has a function to generate the smoothing filters 127 with the smoothing coefficients therein. This function is available when none of the smoothing filters 127 stored in the recording device is suitable for the detected gradient. Thus, a new smoothing filter 127 is generated every time it becomes necessary. How the smoothing filter 127 is generated is illustrated in FIG. 3.

FIG. 3 illustrates the process of generating a 120-degree smoothing filter 127. First, a matrix of numeric regions 51 is provided. Each numeric region will be a single square in the resulting smoothing filter 127. A virtual line is drawn over the certain numeric regions in the direction of the gradient detected by the edge detection section 122. The coefficient "1" is allocated to the numeric regions over which the virtual line crosses. The coefficient "0" is allocated to the remaining numeric regions. This stage is shown in FIG. 3(*a*). The coefficient "1" is then divided by a relative distance (actual distance plus one) from the central numeric region to obtain a two-dimensional matrix of smoothing coefficients as shown in FIG. 3(b). The smoothing coefficients in the two-dimensional matrix 52 are normalized so that the sum of all smoothing coefficients is equal to 1. This produces a two-dimensional matrix as shown in FIG. 3(c). The resulting two-dimensional matrix 53 is used as the smoothing filter 127.

The image memory 16 is a buffering memory having two banks, a bank A and a bank B. This memory structure allows one bank (e.g., the bank A) to serve as a rendering buffer while the other bank (e.g., the bank B) is working as a display buffer to display the rendered image, thereby increasing performance for rendering and subsequent display operations.

The display controller 17 generates horizontal synchronizing signals and vertical horizontal synchronizing signals for the display screen 18. The display controller 17 copies the pixel values in the image memory to the two-dimensional display screen 18 to produce a two-dimensional image thereon at a given display rate for the display screen 18.

<Anti-aliasing>

Figure 4:
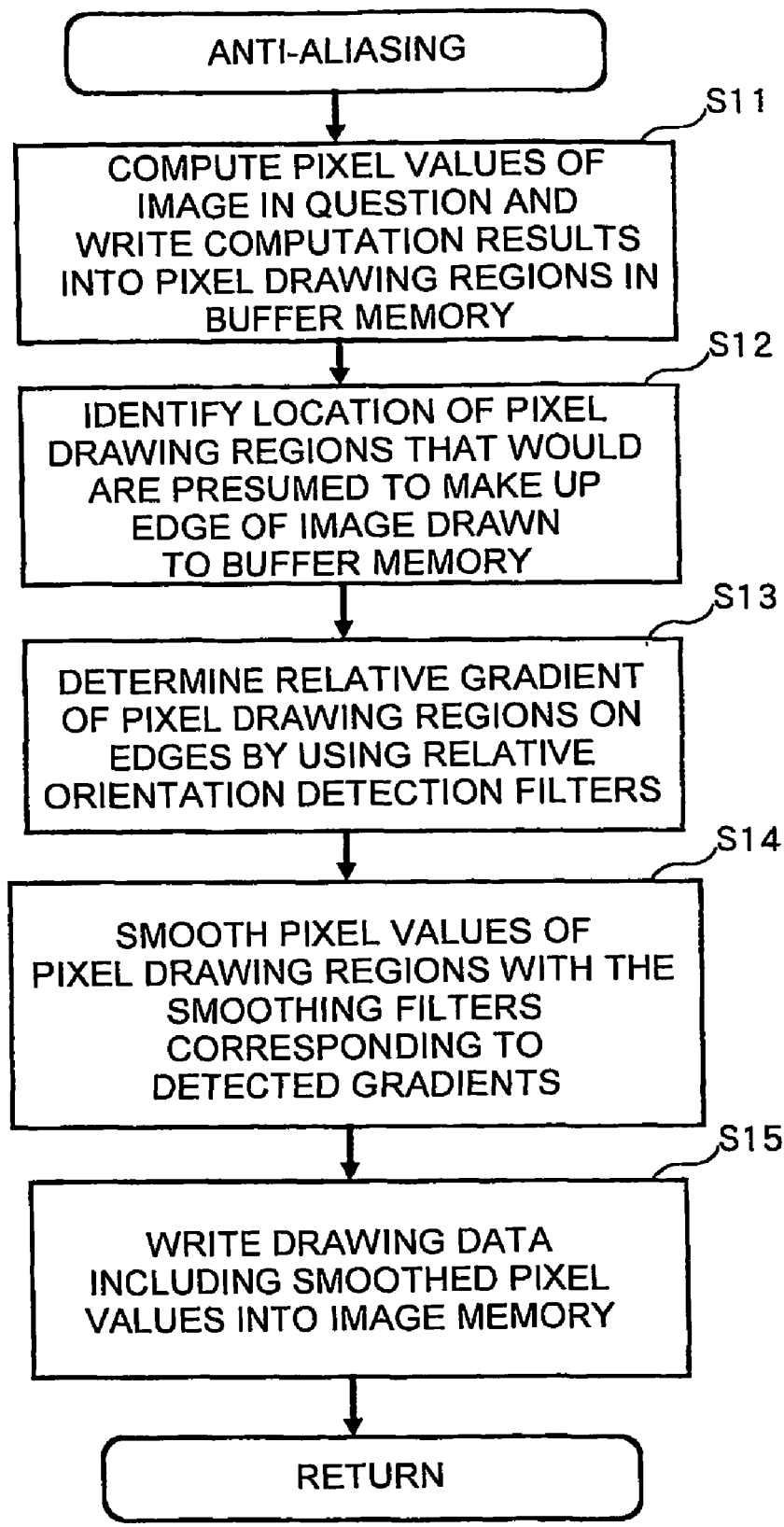
FIG. 4 is a diagram illustrating the entire operation flow of anti-aliasing.
Figure 5:
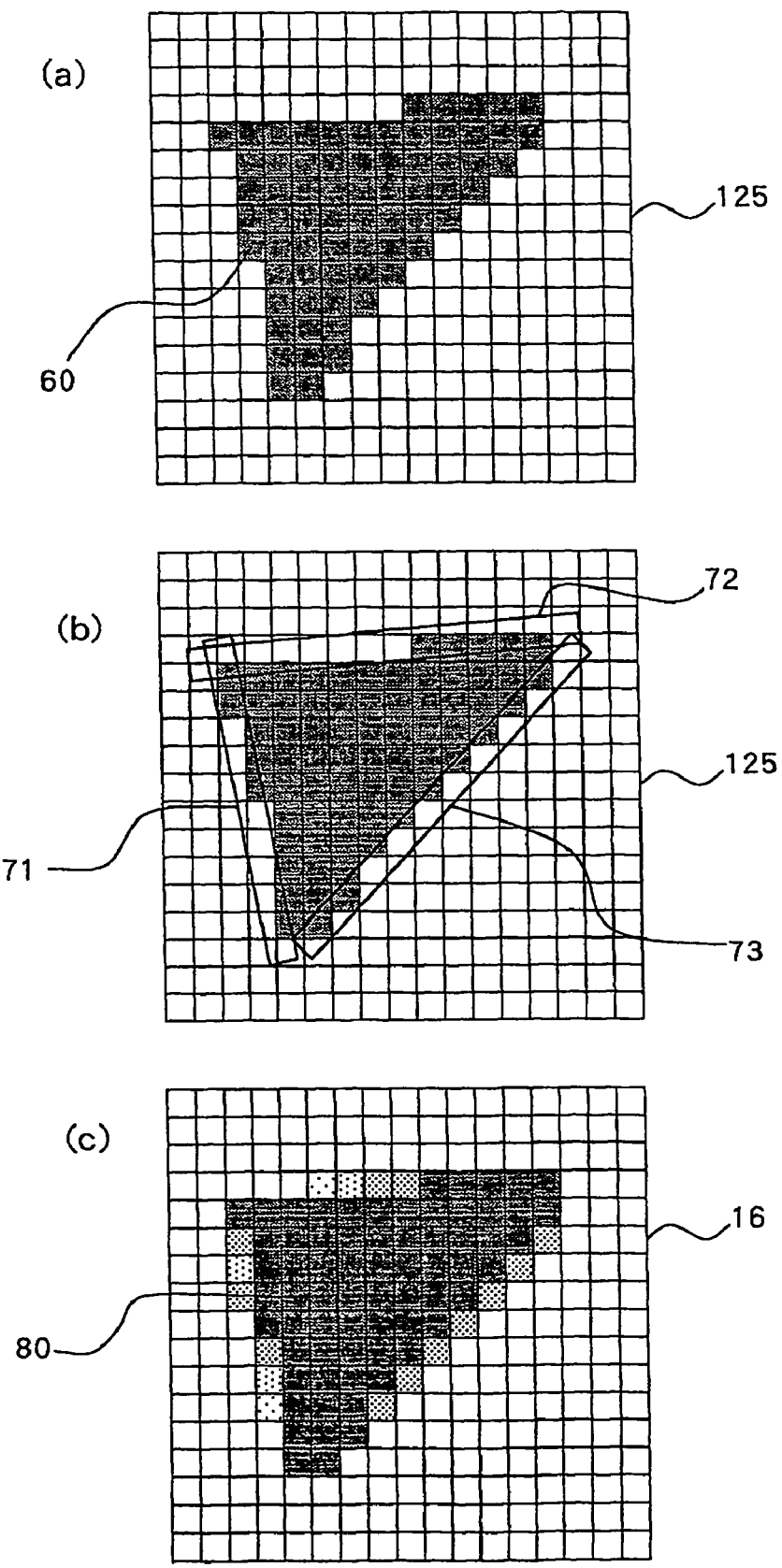

Next, referring to FIGS. 4 and 5, the anti-aliasing performed by the image processor 1, particularly by the rendering unit 12, according to this embodiment is described.

In FIG. 4, the drawing section 121 computes pixel values of an image according to the geometry data that are received from the geometry unit 11 and writes the computation results into the corresponding pixel drawing regions in the buffer memory 125 (step S11). FIG. 5(a) shows an example of an image 60 represented by drawing data written in the buffer memory 125. It should be noted that the exactly horizontal and vertical edges are not jagged. Jaggies on the edge become more noticeable as the edge is away from the horizontal or vertical axis.

The edge detection section 122 identifies the location of pixel drawing regions that are presumed to make up an edge by applying the edge extraction filter to the image drawn to the buffer memory 125 (step S12). In this step, the edge detection section 122 identifies connected sequences of pixel drawing regions 71 to 73 shown in FIG. 5(b). Furthermore, the edge detection section 122 determines a relative gradient of each of the pixel drawing regions 71 to 73 on the edges, by using a plurality of relative orientation detection filters 126 (step S13).

The smoothing section 123 smoothes the pixel values of the pixel drawing regions 71 to 73 with the smoothing filters 127 corresponding to the detected relative orientations (step S14). Then, it writes drawing data including the smoothed pixel values into the image memory 16. This indicates that the smoothed image is drawn to the image memory 16 (step S15). FIG. 5(c) shows an image 80 drawn to the image memory 16.

<Detection of Orientation>

Next, procedures of the individual steps in FIG. 4 are described more in detail.

First, the procedure of the orientation detection at the step S13 is described with reference to FIG. 6.

Figure 6:
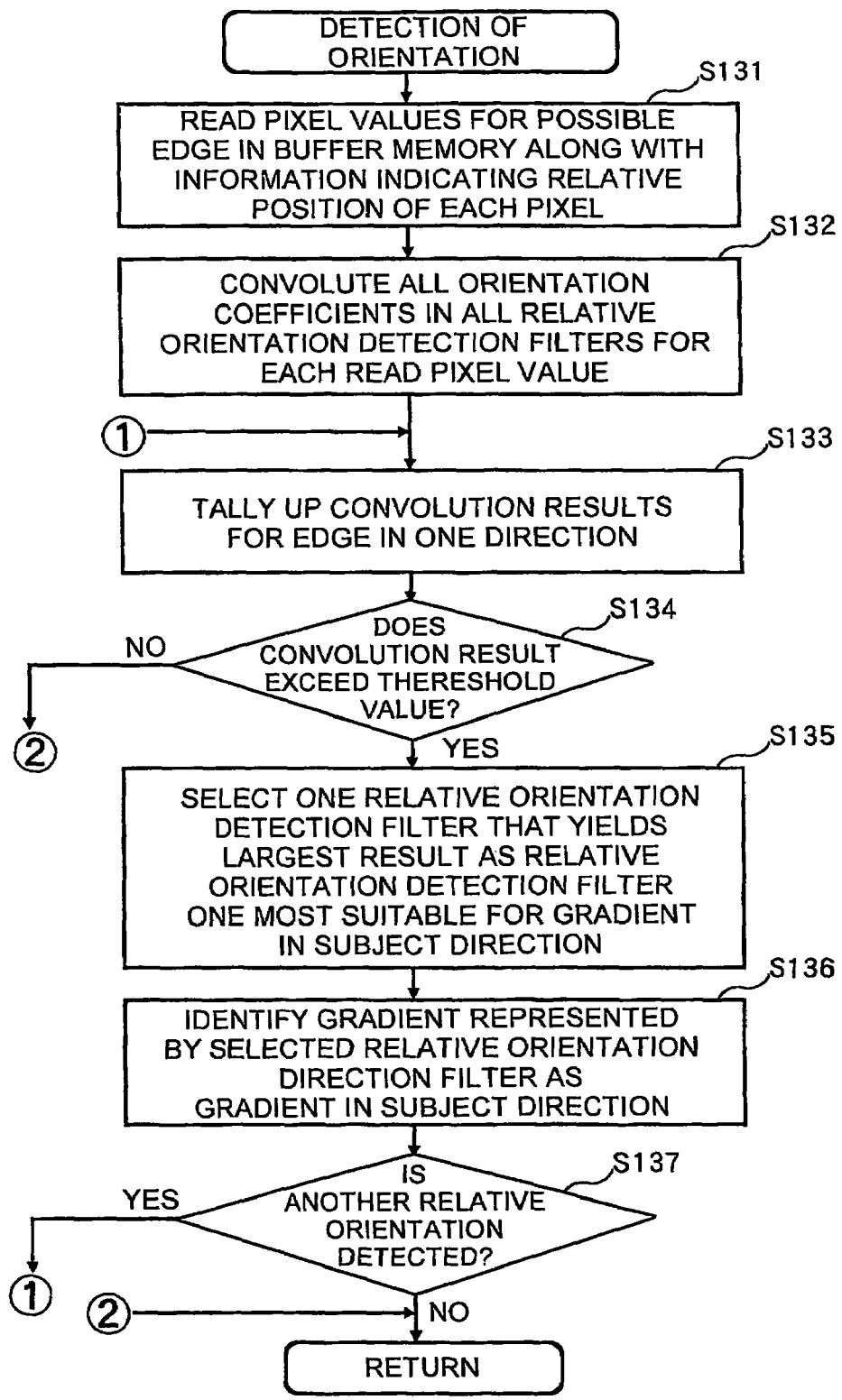
FIG. 6 is a diagram illustrating details of a flow of orientation detection operation.

In FIG. 6, the edge detection section 122 reads the pixel values for the possible edge in the buffer memory 125 along with information indicating the relative position of each pixel (step S131). It performs convolution of all orientation coefficients in all relative orientation detection filters 126 for each read pixel value (step S132), and tallies up the convolution results for the edge in one direction (step S133). Then, it selects out one relative orientation detection filter 126 for which the convolution result exceeds a predetermined threshold value (step S134: Yes) and yields the largest result, as the one that is most suitable for the gradient in the subject direction (step S135), and identifies the gradient represented by the selected relative orientation detection filter as the gradient in the subject direction (step S136). Any pixels in the image where the value of the convolved pixel drawing region is below the threshold are considered to be a non-edge pixel.

In order to detect another relative orientation, the processing after the step S133 is repeated (step S137: Yes). The detection of orientation is terminated when no other relative orientation is required to be detected (step S137: No).

<Smoothing>

The smoothing in the above step S14 may be performed in either one of the following three procedural patterns.

Figure 7:
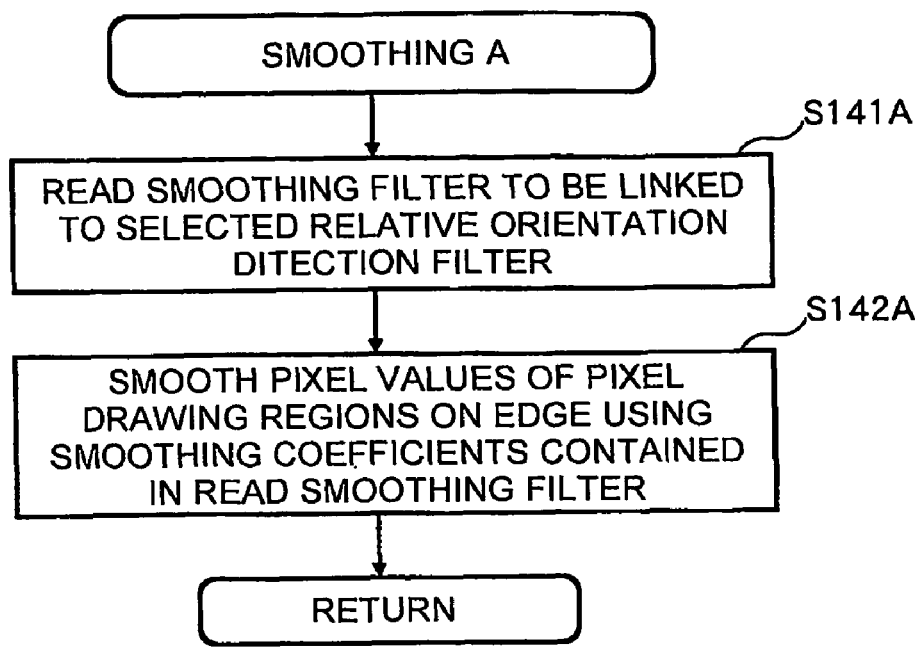
FIG. 7 is a diagram illustrating an operation flow of smoothing for a case where relative orientation detection filters are linked previously to respective smoothing filters of the same relative orientation.

FIG. 7 shows an example where each relative orientation detection filter 126 is previously linked to a smoothing filter in the same relative orientation. More specifically, the smoothing filter 127 to be linked to the relative orientation detection filter 126 that is selected out by the edge detection section 122 is read (step S141A). The pixel values of the pixel drawing regions on the edge are smoothed using the smoothing coefficients contained in the read smoothing filter 127 (step S142A).

Figure 8:
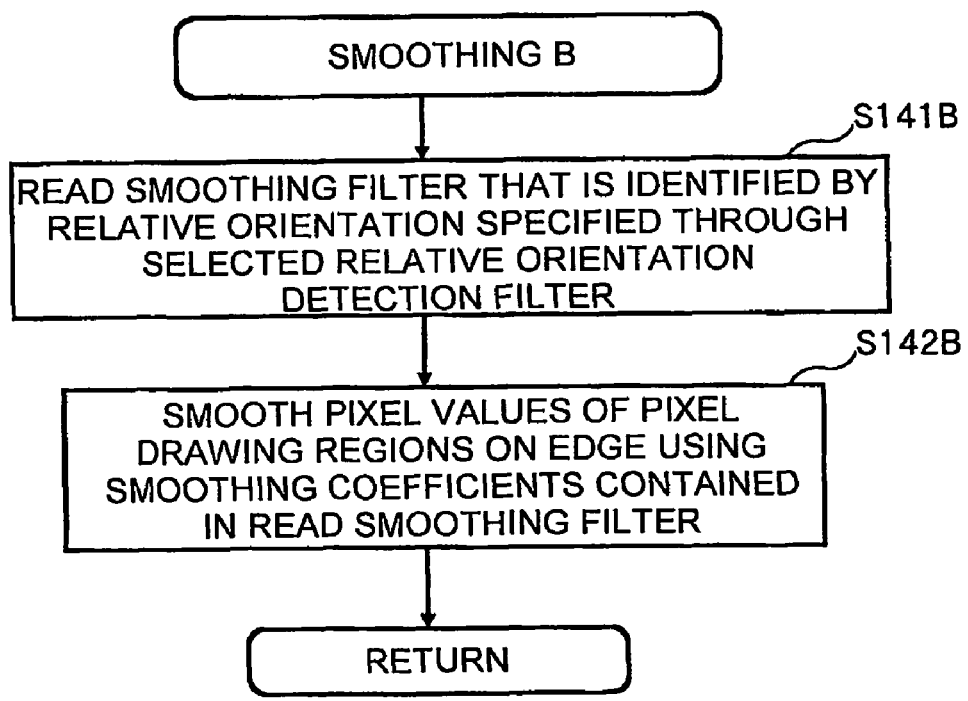
FIG. 8 is a diagram illustrating an operation flow of smoothing for a case where smoothing filters are held in such a manner that they can be distinguished according to the relative orientation of an edge segment despite that they are independent of relative orientation detection filters.

FIG. 8 shows an example where a plurality of smoothing filters 127 are held in such a manner that they can be distinguished according to the relative orientation of an edge segment despite that they are independent of the relative orientation detection filters 126. More specifically, a smoothing filter is read that is identified by the relative orientation specified through the relative orientation detection filter 126 selected out by the edge detection section 122 (step S141B). The pixel values of the pixel drawing regions on the edge are smoothed using the smoothing coefficients contained in the read smoothing filter 127 (step S142B).

Figure 9:
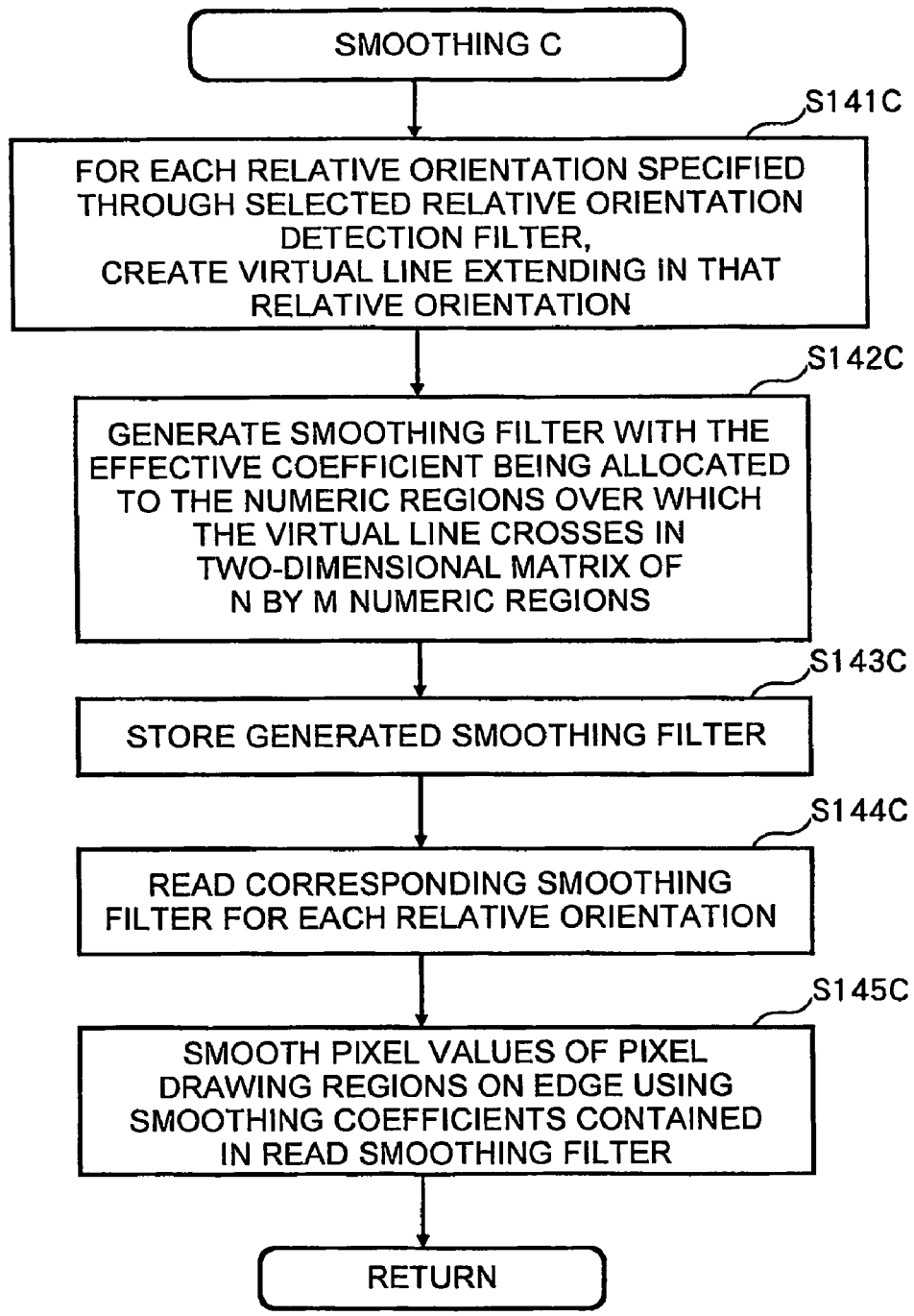
FIG. 9 is a diagram illustrating an operation flow of smoothing for a case where a smoothing filter containing smoothing coefficients for a given gradient is generated and stored every time when it becomes necessary.
Figure 10:
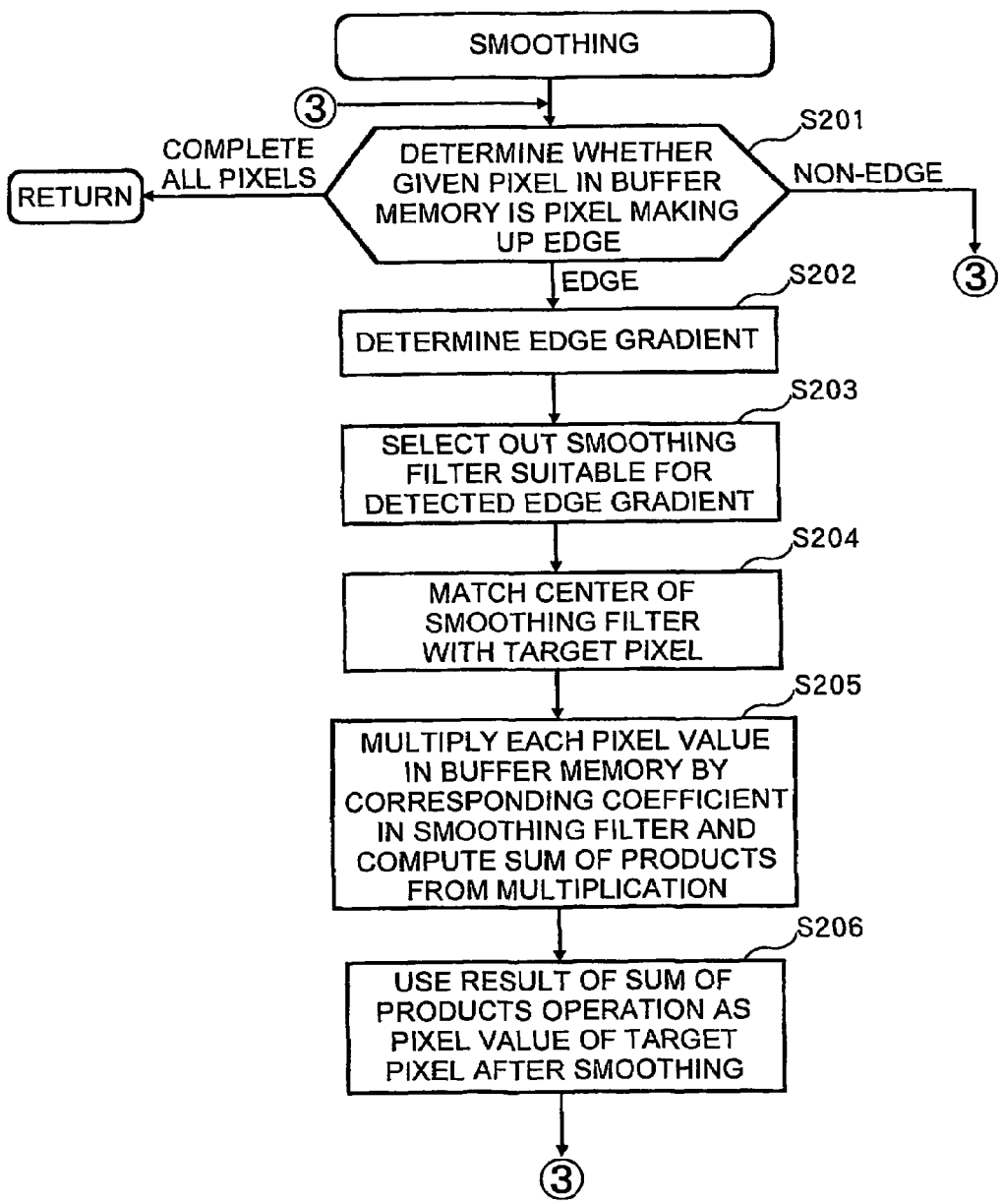
FIG. 10 is a diagram illustrating specific operation flow of smoothing.

FIG. 9 shows an example where a smoothing filter 127 containing smoothing coefficients for a given gradient is generated and stored every time when it becomes necessary. More specifically, for each relative orientation specified through the relative orientation detection filter 126 selected out by the edge detection section 122, a virtual line extending in the direction of that relative orientation is created (step S141C). Thereafter, a two-dimensional matrix of N by M numeric regions (wherein N an M are each a natural number equal to or larger than 3, and N may be equal to M) is generated as the smoothing filter, with the effective coefficient being allocated to the numeric regions over which the virtual line crosses (step S142C). The generated smoothing filter 127 is stored (step S143C). Then, for each relative orientation, the corresponding smoothing filter 127 is read (step S144C), and the pixel values of the pixel drawing regions on the edge are smoothed using the smoothing coefficients contained in the read smoothing filter 127 (step S145C).

Details of the smoothing operation are described with reference to FIGS. 10 to 13.

The smoothing operation is performed equally on all pixels drawn to the buffer memory 125. This means that the smoothing filter 127 is slid over the buffer memory 125 so that the center of the smoothing filter 127 passes over every pixel drawing region in the buffer memory 125. The example described below is a case where information about the gradient of the target pixel on the edge is used rather than information indicating in which pixel drawing region the target pixel value is contained. More specifically, in FIG. 10, it is determined whether a given pixel in the buffer memory 125 is a pixel making up an edge (step S201). When it is not the pixel on the edge, the filter is translocated and the operation in the step S201 is again performed for another pixel. When the step S201 determines that the pixel in question is the one making up the edge, the gradient of the edge is detected (step S202). Then, a smoothing filter 127 suitable for the detected gradient is selected out (step S203). Thereafter, the center of the selected smoothing filter 127 is matched with the target pixel on the edge (step S204). For the case shown in FIG. 11, the relative gradient is equal to 120 degrees, so that the 120-degree smoothing filter 127 is centered on the target pixel (step S204).

Each pixel value in the buffer memory 125 is multiplied by the corresponding coefficient in the smoothing filter 127 and the sum of products from the multiplication is computed (step S205). The result of this operation is written at the location that corresponds to the target pixel where the smoothing filter 127 is centered (step S206). After the smoothing operation for one pixel is completed, the target pixel value after smoothing is temporarily stored in a predetermined memory region. The center of the smoothing filter 127 is slid to the next target pixel. Then, the steps from the step S201 are repeated for other pixels in the buffer memory 125. After completion of the smoothing of all pixel values, a series of smoothing operation is terminated.

The step S203 may be skipped depending on the gradient of the edge detected in the step S202. In such a case, the operation from the step S201 is performed only when a certain angle condition is satisfied. Example of such an angle condition may be that the detected gradient is not in a substantially horizontal or vertical direction.

Figure 13:
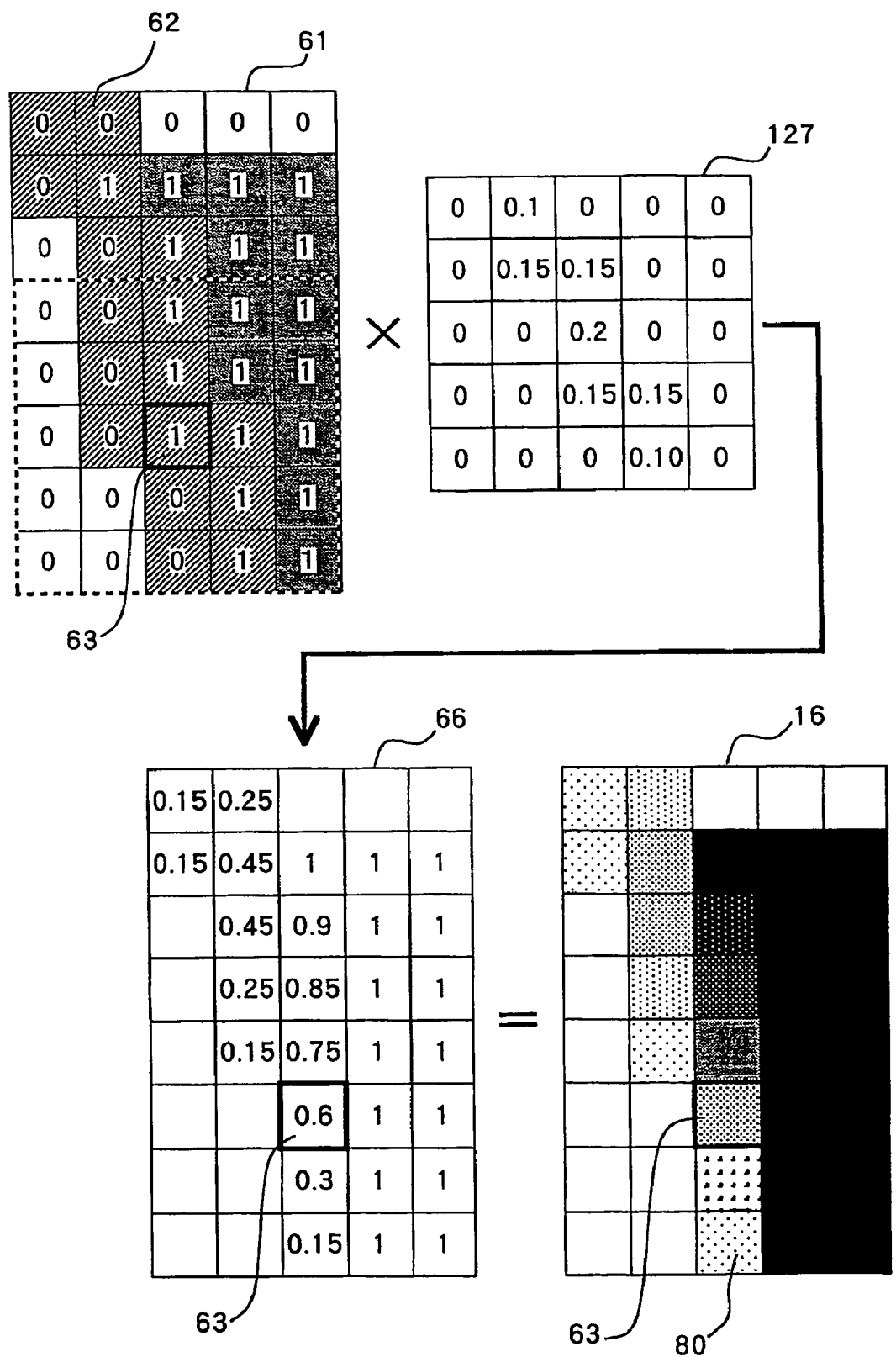
FIG. 13 illustrates how the anti-aliasing is achieved according to the present invention.

The upper half of FIG. 13 illustrates the concept of the above-mentioned smoothing operation. The upper left block in FIG. 13 shows a part of the buffer memory 125. The buffer memory 125 has pixel drawing regions, some of which are denoted by the reference numerals 61 and 62. Each pixel drawing region in the buffer memory 125 represents a single pixel in the final image to be produced on a display screen 18. Each of the pixels rendered to the buffer memory 125 has a pixel value which describes characteristic features (e.g., color, brightness) of that pixel. In the upper left block in FIG. 13, the numbers "1" and "0" are the pixel values of the respective pixel drawing regions. The pixel drawing regions 62 with diagonal hatching from lower left to top right represent the pixels on the unsmoothed edge of the image.

Figures 11, 12:
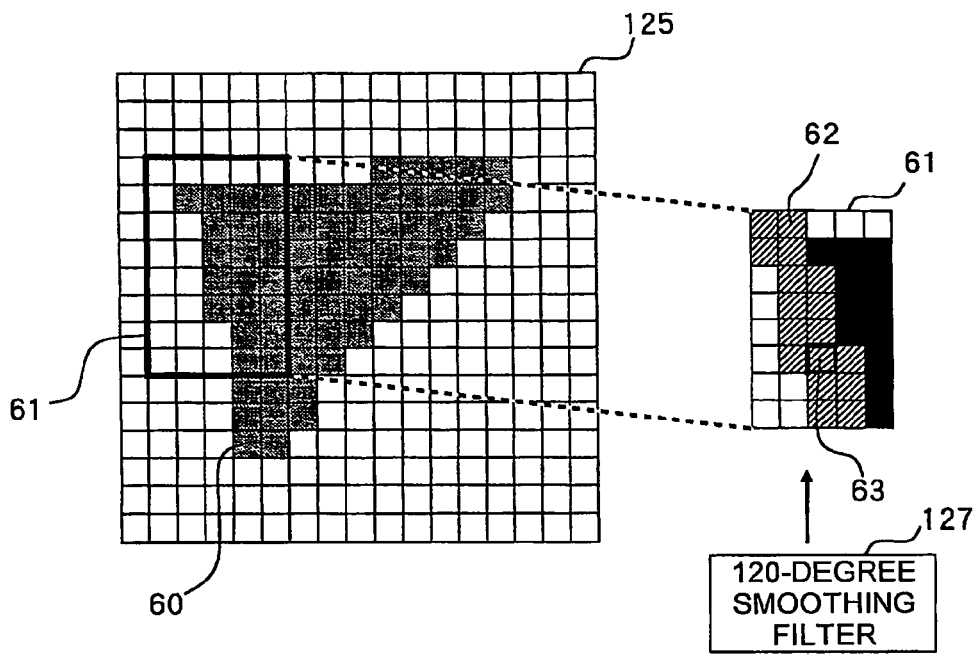
FIG. 11 is a representation for illustrating how an edge is detected.
FIG. 12 is a representation for illustrating how a target pixel value is smoothed.

The upper right block in FIG. 13 shows one of the smoothing filters 127. As described above, the smoothing filter 127 is a matrix of smoothing coefficients. Every number contained in the smoothing filter 127 in FIG. 13 is the smoothing coefficient for this filter. In order to smooth the edge (made up of the pixel drawing regions 62), the convolution is performed individually on each pixel value. The operation begins when the smoothing filter 127 is superimposed over the pixel drawing regions. This is done in such a manner that the center of the smoothing filter (with the coefficient of 0.2 in the example shown in the upper right block in FIG. 13) is matched with the pixel drawing region to be convolved. The pixel represented by the pixel drawing region which is subject to convolution is the target pixel. For example, when the convolution is performed with the center of the smoothing filter 127 being aligned with the target pixel 63, the convolution result of 0.6 is given as shown in the lower left block in FIG. 13. How the convolution is made for this combination is illustrated in FIG. 12. As apparent from FIG. 12, each pixel value is multiplied by the corresponding smoothing coefficient. Then, the sum of products from the multiplication step is computed, which yields the pixel value of 0.6. To perform convolution on the entire image, the above-mentioned operation is repeated individually for each pixel.

The lower left block in FIG. 13 shows the pixel drawing regions 66 after completion of the smoothing operation. These pixel drawing regions are a part of the image memory 16. The lower right block in FIG. 13 shows the final image (smoothed image) drawn to the image memory 16. The dotted regions 80 correspond to the smoothed edge segment of the resulting image.

As to the decision about the necessity of the smoothing, the above description is made in conjunction with a case where the smoothing is performed when a certain angle condition is satisfied. However, even connected sequences of pixel drawing regions that are associated with the same angle may appear differently when they are drawn, depending on whether they are a sequence of three to five regions or a sequence of ten or more regions. Therefore, the number of regions in a given sequence may be detected. The result of detection may be used to determine whether the smoothing is made or whether the number of squares in the smoothing filter 127 is changed (e.g., a 3×3 matrix in place of a 5×5 matrix).

Individual pixels on the edges in the same direction must have the same edge direction, so that the pixels on these edges can be determined to have the same gradient. Alternatively, the gradient of each pixel on the edges may be determined according to texture patterns stored in the texture memory 124.

Other Embodiments

Figure 14:
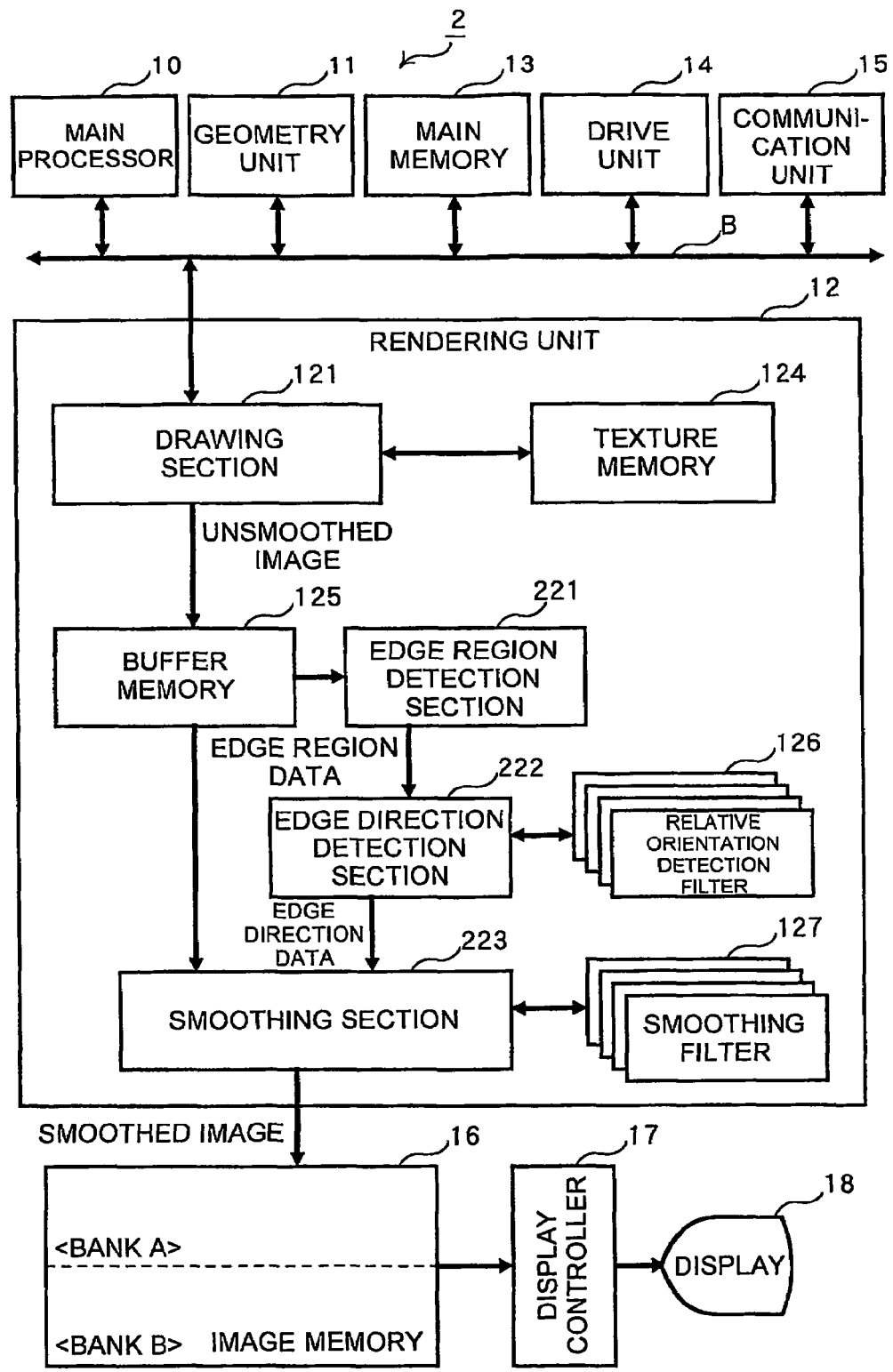

FIG. 14 shows a configuration of an image processor according to another embodiment of the present invention. For convenience, components and parts having similar functions to those shown in FIG. 1 are represented by the like reference numerals.

The image processor in FIG. 14 is different from the image processor shown in FIG. 1 in that the above-mentioned relative orientation detection filters 126 and the smoothing filter 127 are provided independently of each other; unsmoothed images in the rendering unit 12 are directly loaded onto the smoothing section 224 after being drawn to the buffer memory 125; and the processing system for edge detection is a combination of an edge region detection section 221 and an edge direction detection section 222.

The edge region detection section 221 applies an edge detection filter (not shown) to the unsmoothed image drawn to the buffer memory 125. The edge detection filter is used for detecting "possible" edges in an image. When a possible edge is found, the edge region detection section 221 generates edge region data. The edge region data indicate which connected sequence of pixel drawing regions is presumed to be the edge. The edge region detection section 221 then supplies the edge region data to the edge direction detection section 222. This operation flow is described with reference to FIGS. 17(a) and 17(b).

Figure 17:
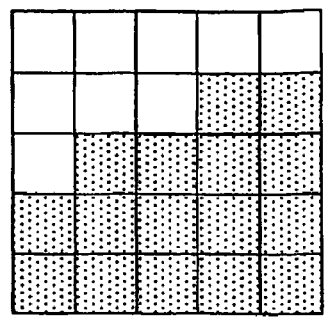
FIG. 17($a$) is a representation of an unsmoothed image.

FIG. 17(a) shows an unsmoothed image drawn to the buffer memory 125. The edge region detection section 221 applies an edge detection filter to this image. This filtering produces an image where the higher value indicates the presence of an edge. As in the case of the filtered image shown in FIG. 17(b), the value "1" indicates the presence of the edge and the value "0" represents the non-edge portions of the image. The edge region detection section 221 generates the edge region data including these values along with information about their relative locations. As can be seen from FIGS. 17(a) and 17(b), the arrangement of the pixel drawing regions with the value "1" does not match the location of the actual boundary (edge) in the image. The actual edge is determined by identifying significant changes in pixel intensity in the image. Accordingly, the value "1" is allocated to the adjacent pairs of pixels, depicted by white and gray squares in FIG. 17(a). This also applies to the above-mentioned embodiment.

The edge direction detection section 222 generates edge direction data according to the edge region data and the direction specified by the relative orientation detection filters 126. The edge direction data represent a relative gradient of a connected sequence of pixel drawing regions on the edge. The edge direction detection section 222 then supplies the edge direction data to the smoothing section 223. The edge direction data may have a structure as shown in FIG. 17(c). More specifically, the edge direction data are made up of angle data which indicate the degree measure of the angle (B) between the edge direction and the horizontal or vertical axis of the two-dimensional matrix.

The angle (B) can be obtained as follows.

First, three relative orientation detection filters 126 are selected out for each pixel having the coefficient "1" in the edge region data in FIG. 17(b). This selection is made according to the convolution results for that pixel. More specifically, all relative orientation detection filters 126 are centered one by one on a pixel having the coefficient "1" in the edge region data and convolution is performed, yielding the corresponding number of convolution results. Among them the largest convolution result is expected to be the closest to the exact angle (B). Therefore, three convolution results are chosen in descending order from the largest one and the corresponding relative orientation detection filters are specified. The same procedure is repeated for all pixels having "1". After determining three directions (angles) per each pixel, quadratic interpolation is performed.

Figure 15:
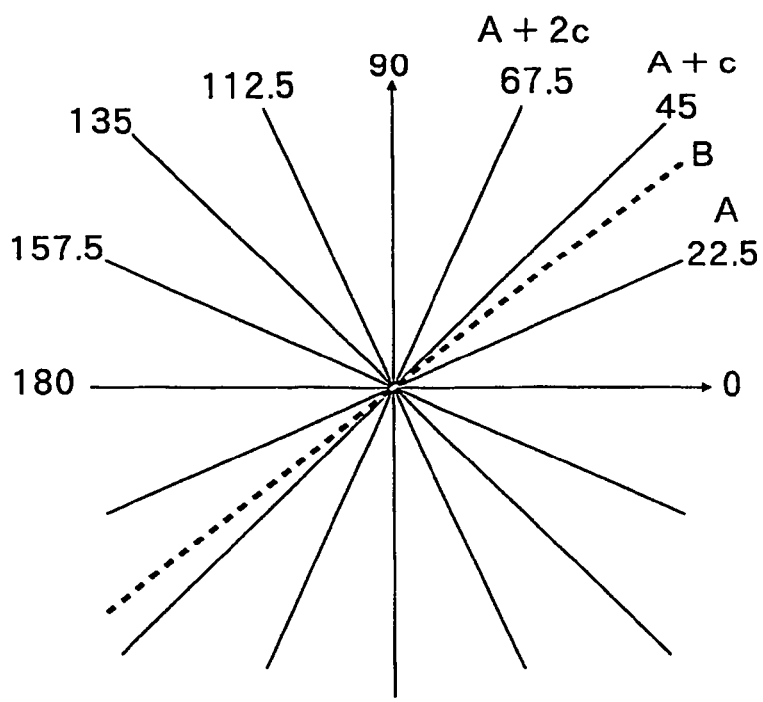
FIG. 15 is a diagrammatic expression for illustrating how an unknown angle is estimated using interpolation of known angles.

For example, referring to FIG. 15, it is assumed that sixteen relative orientation detection filters 126 are provided for every 22.5 degrees and that the one corresponding to the angle A+c (45 degrees) yields the largest result (wherein "c" represents a sampling value). The relative orientation detection filters corresponding to the angle A (22.5 degrees) and the angle A+2c (67.5 degrees) are assumed to yield the second and third largest results, respectively. The convolution results obtained with these filters are quadratic interpolated. The resulting median angle is identified as the direction of the edge and the angle of direction is determined as the angle (B).

Figure 16:
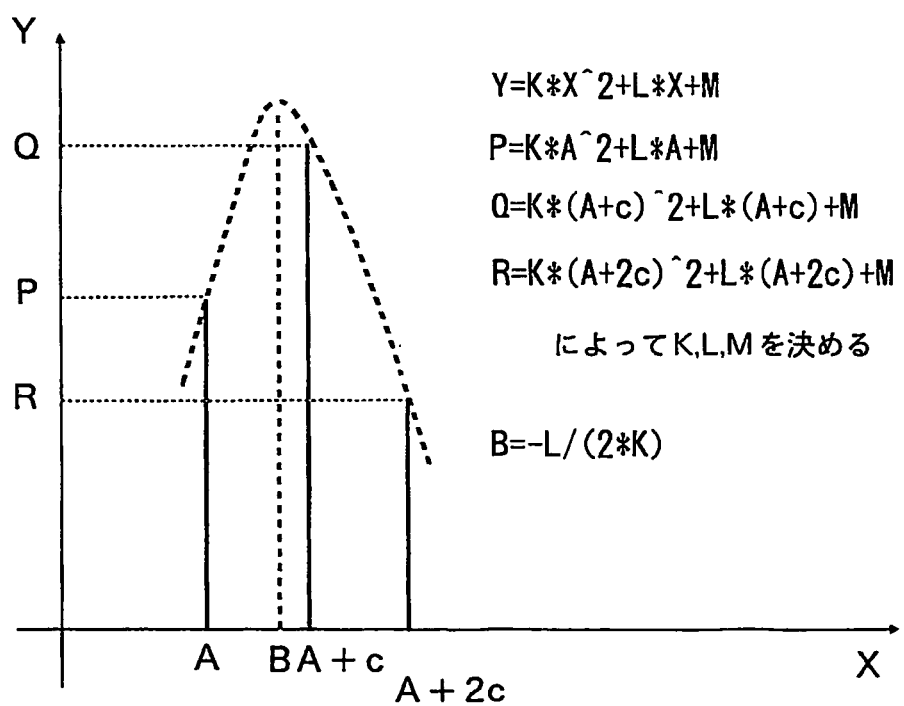
FIG. 16 is a graph showing the relation between convolution results and angles.

This operation is described further with reference to FIG. 16.

Quadratic interpolation is a method to obtain an estimate of the unknown value from a set of three values. The median of three directions (i.e., three specified angles) is computed in this embodiment. This median angle is used as the angle (B). As is well known in the art, quadratic interpolation involves fitting a parabola to the three data points. A parabola is a graph of a quadratic equation in the form of $y=ax_2+bx+c$. This formula is represented as $Y=K*X^2+L*X+M$ for the graph shown in FIG. 16. In FIG. 16, the abscissa X represents the angle. The ordinate Y represents the sum of coefficients specified by the edge region data, i.e., the result of convolution for each angle. K and L are constants, and M is a fixed bias value. Therefore, the following system of three equations is obtained:

$P=K*A^2+L*A+M$ $Q=K*(A+c)^2+L*(A+c)+M$ $R=K*(A+2c)^2+L*(A+2c)+M.$

Obviously, the data points, (A,P), (A+c,Q), and (A+2c,R) all lie on the parabola in FIG. 16. The three unknowns K, L, and M are determined by substituting the Y coordinates of these data points for P, Q, and R in the above simultaneous equations. Then, given the quadratic function $Y=K*X^2+L*X+M$, the location of the vertex of the parabola is given by the formula $-L/(2*K)$. From the coordinates of the vertex, the angle (B) is obtained.

The edge direction detection section 222 informs the smoothing section 223 of the angle (B). The smoothing section 223 generates a smoothing filter in which smoothing coefficients are contained in the direction represented by the angle (B), according to the procedure illustrated in, for example, FIGS. 3(a) to 3(c). The smoothing section 223 stores the smoothing filter in the memory region within the rendering unit 12. Alternatively, the smoothing section 223 selects out one smoothing filter 127 in which smoothing coefficients are contained in a direction that is the closest to the direction represented by the angle (B), from the smoothing filters previously prepared.

Then, by using the smoothing coefficients contained in the smoothing filter 127, smoothing is performed individually on each pixel value corresponding to the pixel with the angle (B) in the buffer memory 125. Details of the smoothing operation are as described above.

The invention claimed is:

1. An image processor for use in drawing an image to a memory having a two-dimensional matrix of pixel drawing regions, each of the pixel drawing regions representing a single pixel in the image, said image processor comprising:
   a plurality of relative orientation detection filters each representing a distinguishing feature of a relative orientation of an edge segment to be drawn to the memory;
   drawing means for drawing the image to the memory or a buffer having the same structure as the memory;
   detection means for
      automatically detecting a connected sequence of pixel drawing regions making up an edge in the image drawn by said drawing means by applying an edge extraction filter, and
      detecting the relative orientation of the connected sequence of pixel drawing regions by means of
         selecting out a predetermined number of relative orientation detection filters each representing a distinguishing feature that is closer to the distinguishing feature of the connected sequence of pixel drawing regions in question, and
         performing interpolation with the relative orientations specified by the selected relative orientation detection filters; and
   smoothing means for smoothing a pixel value of each pixel in the connected sequence of pixel drawing regions on the edge using smoothing coefficients, the smoothing coefficients being either computed depending on the relative orientation detected by said detection means or obtained from outside,
   wherein each of said plurality of relative orientation detection filters is a two-dimensional matrix of predetermined orientation coefficients, the orientation coefficients including zero orientation coefficients each having a value of zero and non-zero orientation coefficients each having a value other than zero, the non-zero orientation coefficients being aligned relative to each other in a predetermined direction,
   said detection means
      performing convolution of all orientation coefficients contained in said relative orientation detection filters, with each pixel value of the connected sequence of pixel drawing regions making up the edge, selecting out a predetermined number of relative orientation detection filters for which their respective convolution results in a single direction exceed a predetermined threshold value and yield the largest result, the second largest result, and the third largest result, respectively, as the relative orientation filters having their respective distinguishing features that are closer to the distinguishing feature in the subject direction, and distributing, using interpolation, the relative orientations specified by the selected relative orientation detection filters, thereby determining one relative orientation.

2. The image processor as claimed in claim 1, wherein said smoothing means has a plurality of smoothing filters each containing predetermined smoothing coefficients, the smoothing coefficients including zero smoothing coefficients each having a value of zero and non-zero smoothing coefficients each having a value other than zero, said smoothing filter being linked to one of said relative orientation detection filters in such a manner that the non-zero smoothing coefficients being arranged in the same pattern as the non-zero orientation coefficients in said relative orientation detection filters, said smoothing means identifying, in response to the selection of the relative orientation detection filter by said detection means, the smoothing filter that is linked to the selected relative orientation detection filter, performing convolution of the smoothing coefficients of the identified smoothing filter individually with each pixel value of the connected sequence of pixel drawing regions making up the edge, and replacing a target pixel value in the connected sequence of pixel drawing regions with the convolution result, thereby smoothing the focused pixel value.

3. The image processor as claimed in claim 1, wherein said smoothing means generates a smoothing filter which is a matrix of predetermined smoothing coefficients, the smoothing coefficients including zero smoothing coefficients each having a value of zero and non-zero smoothing coefficients each having a value other than zero, the non-zero smoothing coefficients in the generated smoothing filter being arranged in the direction of the relative orientation detected by said detection means, performs convolution of the smoothing coefficients of that smoothing filter individually with each pixel value of the connected sequence of pixel drawing regions making up the edge, and replaces a target pixel value in the connected sequence of pixel drawing regions with the convolution result, thereby smoothing the focused pixel value.

4. An image processor for use in drawing an image to a memory having a two-dimensional matrix of pixel drawing regions, each of the pixel drawing regions representing a single pixel in the image, said image processor comprising:

a plurality of relative orientation detection filters each representing a distinguishing feature of a relative orientation of an edge segment to be drawn to the memory;

drawing means for drawing the image to the memory or a buffer having the same structure as the memory;

detection means for detecting a connected sequence of pixel drawing regions making up an edge in the image drawn by said drawing means, and detecting the relative orientation of the connected sequence of pixel drawing regions by means of selecting out a predetermined number of relative orientation detection filters each representing a distinguishing feature that is closer to the distinguishing feature of the connected sequence of pixel drawing regions, and performing interpolation with the relative orientations specified by the selected relative orientation detection filters; and smoothing means for smoothing a pixel value of each pixel in the connected sequence of pixel drawing regions on the edge using smoothing coefficients, the smoothing coefficients being either computed depending on the relative orientation detected by said detection means or obtained from outside, wherein each of said plurality of relative orientation detection filters is a two-dimensional matrix of predetermined orientation coefficients, the orientation coefficients including zero orientation coefficients each having a value of zero and non-zero orientation coefficients each having a value other than zero, the non-zero orientation coefficients being aligned relative to each other in a predetermined direction;

said detection means performing convolution of all orientation coefficients contained in said relative orientation detection filters, with each pixel value of the connected sequence of pixel drawing regions making up the edge, selecting out a predetermined number of relative orientation detection filters for which their respective convolution results in a single direction exceed a predetermined threshold value and yield the largest result, the second largest result, and the third largest result, respectively, as the relative orientation filters having their respective distinguishing features that are closer to the distinguishing feature in the subject direction, and distributing, using interpolation, the relative orientations specified by the selected relative orientation detection filters, thereby determining one relative orientation.

5. The image processor as claimed in claim 4, wherein said smoothing filter having a two-dimensional matrix of smoothing coefficients, the smoothing coefficients including zero smoothing coefficients each having a value of zero and non-zero smoothing coefficients each having a value other than zero, the non-zero smoothing coefficients more distant from the center of the filter having smaller non-zero values, the non-zero smoothing coefficients being arranged in the direction of the detected relative orientation, said smoothing means performing convolution of all smoothing coefficients contained in the smoothing filter in question, with a target pixel in the connected sequence of pixel drawing regions making up the edge in such a manner that the center of the smoothing filter is matched with the target pixel.

6. The image processor as claimed in claim 5, wherein the smoothing coefficients in each smoothing filter are normalized so that the smoothing filters with different patterns of arrangement of the smoothing coefficients are on the same scale.

7. The image processor as claimed in claim 4, wherein said smoothing means performs smoothing only when the relative orientation detected by said detection means forms a predetermined angle with respect to the horizontal or vertical axis of the matrix and when at least a predetermined number of pixel drawing regions having the same relative orientation are arranged in sequence.

8. The image processor as claimed in claim 4, wherein the relative orientations specified by the selected relative orientation detection filters are distributed using interpolation to determine one relative orientation, B, using the following equations:

$$P = K*A^2 + L*A + M;$$

$$Q = K*(A+c)^2 + L*(A+c) + M;$$

$$R = K*(A+2c)^2 + L*(A+2c) + M;$$

$$B = -L/(2*K);$$

where Q is the largest convolution result; where P and R are the second and third largest convolution results; where K, L, and M are constants; where A+c is the angle corresponding to relative orientation detection filter yielding the largest convolution result; where A is the angle corresponding to the relative orientation detection filter that yielded the result P; and where A+2c is the angle corresponding to the relative orientation detection filter that yielded the result R.

9. An image processing method performed by a processor having access to a memory to which an image is drawn and a plurality of relative orientation detection filters, the memory having a two-dimensional matrix of pixel drawing regions, each of the pixel drawing regions representing a single pixel in the image, each of the relative orientation detection filters representing a distinguishing feature of a relative orientation of an edge segment to be drawn to the memory, said method comprising the steps of:
(1) drawing the image to the memory or a buffer having the same structure as the memory without performing anti-aliasing operation;
(2) automatically detecting a connected sequence of pixel drawing regions making up an edge in the drawn image by applying an edge extraction filter;
(3) detecting the relative orientation of the connected sequence of pixel drawing regions by
selecting out a predetermined number of relative orientation detection filters each representing a distinguishing feature that is closer to the distinguishing feature of the connected sequence of pixel drawing regions in question, and
performing interpolation with the relative orientations specified by the selected relative orientation detection filters; and
(4) generating a smoothing filter which is a matrix of smoothing coefficients, the smoothing coefficients including zero smoothing coefficients each having a value of zero and non-zero smoothing coefficients each having a value other than zero, the non-zero smoothing coefficients in the generated smoothing filter being arranged in the direction of the relative orientation, or alternatively, obtaining the smoothing filter that has been prepared previously;
performing convolution of the smoothing coefficients of that smoothing filter individually with each pixel value of the connected sequence of pixel drawing regions; and
replacing a target pixel value in the connected sequence of pixel drawing regions with the convolution result, thereby smoothing the focused pixel value, thereby anti-aliasing the image having the edge including the target pixel value, wherein each of said plurality of relative orientation detection filters is a two-dimensional matrix of predetermined orientation coefficients, the orientation coefficients including zero orientation coefficients each having a value of zero and non-zero orientation coefficients each having a value other than zero, the non-zero orientation coefficients being aligned relative to each other in a predetermined direction,
wherein detecting the relative orientation further comprises
performing convolution of all orientation coefficients contained in said relative orientation detection filters, with each pixel value of the connected sequence of pixel drawing regions making up the edge,
selecting out a predetermined number of relative orientation detection filters for which their respective convolution results in a single direction exceed a predetermined threshold value and yield the largest result, the second largest result, and the third largest result, respectively, as the relative orientation filters having their respective distinguishing features that are closer to the distinguishing feature in the subject direction, and
distributing, using interpolation, the relative orientations specified by the selected relative orientation detection filters, thereby determining one relative orientation.

10. An image processing method performed by a processor having access to a memory to which an image is drawn and a plurality of relative orientation detection filters, the memory having a two-dimensional matrix of pixel drawing regions, each of the pixel drawing regions representing a single pixel in the image, each of the relative orientation detection filters representing a distinguishing feature of a relative orientation of an edge segment to be drawn to the memory, said method comprising the steps of:
(1) drawing the image to the memory or a buffer having the same structure as the memory without performing anti-aliasing operation;
(2) detecting a connected sequence of pixel drawing regions making up an edge in the drawn image;
(3) detecting the relative orientation of the connected sequence of pixel drawing regions by
selecting out a plurality of relative orientation detection filters each representing a distinguishing feature that is closer to the distinguishing feature of the connected sequence of pixel drawing regions, and
performing interpolation with the relative orientations specified by the selected relative orientation detection filters; and
(4) generating a smoothing filter which is a matrix of smoothing coefficients, the smoothing coefficients including zero smoothing coefficients each having a value of zero and non-zero smoothing coefficients each having a value other than zero, the non-zero smoothing coefficients in the generated smoothing filter being arranged in the direction of the relative orientation, or alternatively, obtaining the smoothing filter that has been prepared previously;
performing convolution of the smoothing coefficients of that smoothing filter individually with each pixel value of the connected sequence of pixel drawing regions; and
replacing a target pixel value in the connected sequence of pixel drawing regions with the convolution result, thereby smoothing the focused pixel value, thereby anti-aliasing the image having the edge including the target pixel value, wherein each of said plurality of relative orientation detection filters is a two-dimensional matrix of predetermined orientation coefficients, the orientation coefficients including zero orientation coefficients each having a value of zero and non-zero orientation coefficients each having a value other than zero, the non-zero orientation coefficients being aligned relative to each other in a predetermined direction, wherein detecting the relative orientation further comprises performing convolution of all orientation coefficients contained in said relative orientation detection filters, with each pixel value of the connected sequence of pixel drawing regions making up the edge, selecting out a predetermined number of relative orientation detection filters for which their respective convolution results in a single direction exceed a predetermined threshold value and yield the largest result, the second largest result, and the third largest result, respectively, as the relative orientation filters having their respective distinguishing features that are closer to the distinguishing feature in the subject direction, and distributing, using interpolation, the relative orientations specified by the selected relative orientation detection filters, thereby determining one relative orientation.

11. A computer program recorded on a computer/readable recording medium and configured to be executed by a processor having access to a memory to which an image is drawn and a plurality of relative orientation detection filters, the memory having a two-dimensional matrix of pixel drawing regions, each of the pixel drawing regions representing a single pixel in the image, each of the relative orientation detection filters representing a distinguishing feature of a relative orientation of an edge segment to be drawn to the memory, said computer program being for the processor to perform the operations of:

(1) drawing the image to the memory or a buffer having the same structure as the memory without performing anti-aliasing operation;

(2) automatically detecting a connected sequence of pixel drawing regions making up an edge in the drawn image by applying an edge extraction filter;

(3) detecting the relative orientation of the connected sequence of pixel drawing regions by selecting out a predetermined number of relative orientation detection filters each representing a distinguishing feature that is closer to the distinguishing feature of the connected sequence of pixel drawing regions in question, and performing interpolation with the relative orientations specified by the selected relative orientation detection filters; and (4) generating a smoothing filter which is a matrix of smoothing coefficients, the smoothing coefficients including zero smoothing coefficients each having a value of zero and non-zero smoothing coefficients each having a value other than zero, the non-zero smoothing coefficients in the generated smoothing filter being arranged in the direction of the relative orientation, or alternatively, obtaining the smoothing filter that has been prepared previously;

performing convolution of the smoothing coefficients of that smoothing filter individually with each pixel value of the connected sequence of pixel drawing regions; and replacing a target pixel value in the connected sequence of pixel drawing regions with the convolution result, thereby smoothing the focused pixel value, thereby anti-aliasing the image having the edge including the target pixel value, wherein each of said plurality of relative orientation detection filters is a two-dimensional matrix of predetermined orientation coefficients, the orientation coefficients including zero orientation coefficients each having a value of zero and non-zero orientation coefficients each having a value other than zero, the non-zero orientation coefficients being aligned relative to each other in a predetermined direction, wherein detecting the relative orientation further comprises performing convolution of all orientation coefficients contained in said relative orientation detection filters, with each pixel value of the connected sequence of pixel drawing regions making up the edge.

selecting out a predetermined number of relative orientation detection filters for which their respective convolution results in a single direction exceed a predetermined threshold value and yield the largest result, the second largest result, and the third largest result, respectively, as the relative orientation filters having their respective distinguishing features that are closer to the distinguishing feature in the subject direction, and distributing, using interpolation the relative orientations specified by the selected relative orientation detection filters, thereby determining one relative orientation.

12. A computer program recorded on a computer-readable recording medium and configured to be executed by a processor having access to a memory to which an image is drawn and a plurality of relative orientation detection filters, the memory having a two-dimensional matrix of pixel drawing regions, each of the pixel drawing regions representing a single pixel in the image, each of the relative orientation detection filters representing a distinguishing feature of a relative orientation of an edge segment to be drawn to the memory, said computer program being for the processor to perform the operations of:

(1) drawing the image to the memory or a buffer having the same structure as the memory without performing anti-aliasing operation;

(2) detecting a connected sequence of pixel drawing regions making up an edge in the drawn image;

(3) detecting the relative orientation of the connected sequence of pixel drawing regions by selecting out a plurality of relative orientation detection filters each representing a distinguishing feature that is closer to the distinguishing feature of the connected sequence of pixel drawing regions, and performing interpolation with the relative orientations specified by the selected relative orientation detection filters; and (4) generating a smoothing filter which is a matrix of smoothing coefficients, the smoothing coefficients including zero smoothing coefficients each having a value of zero and non-zero smoothing coefficients each having a value other than zero, the non-zero smoothing coefficients in the generated smoothing filter being arranged in the direction of the relative orientation, or alternatively, obtaining the smoothing filter that has been prepared previously;

performing convolution of the smoothing coefficients of that smoothing filter individually with each pixel value of the connected sequence of pixel drawing regions; and replacing a target pixel value in the connected sequence of pixel drawing regions with the convolution result, thereby smoothing the focused pixel value, thereby anti-aliasing the image having the edge including the target pixel value, wherein each of said plurality of relative orientation detection filters is a two-dimensional matrix of predetermined orientation coefficients, the orientation coefficients including zero orientation coefficients each having a value of zero and non-zero orientation coefficients each having a value other than zero, the non-zero orientation coefficients being aligned relative to each other in a predetermined direction, wherein detecting the relative orientation further comprises performing convolution of all orientation coefficients contained in said relative orientation detection filters, with each pixel value of the connected sequence of pixel drawing regions making up the edge, selecting out a predetermined number of relative orientation detection filters for which their respective convolution results in a single direction exceed a predetermined threshold value and yield the largest result, the second largest result, and the third largest result, respectively, as the relative orientation filters having their respective distinguishing features that are closer to the distinguishing feature in the subject direction, and distributing, using interpolation, the relative orientations specified by the selected relative orientation detection filters, thereby determining one relative orientation.

* * * * *